(12) United States Patent
Lem et al.

(10) Patent No.: US 11,146,578 B2
(45) Date of Patent: Oct. 12, 2021

(54) METHOD AND SYSTEM FOR EMPLOYING GRAPH ANALYSIS FOR DETECTING MALICIOUS ACTIVITY IN TIME EVOLVING NETWORKS

(71) Applicant: PatternEx, Inc., San Jose, CA (US)

(72) Inventors: Mei Lem, San Jose, CA (US); Ignacio Arnaldo, San Jose, CA (US); Ankit Arun, San Jose, CA (US); Ke Li, San Jose, CA (US); Constantinos Bassias, San Jose, CA (US)

(73) Assignee: PATTERNEX, INC., San Jose, CA (US)

( * ) Notice: Subject to any disclaimer, the term of this patent is extended or adjusted under 35 U.S.C. 154(b) by 69 days.

(21) Appl. No.: 16/045,977

(22) Filed: Jul. 26, 2018

(65) Prior Publication Data

US 2019/0132344 A1    May 2, 2019

Related U.S. Application Data

(63) Continuation-in-part of application No. 15/821,231, filed on Nov. 22, 2017, now Pat. No. 10,367,841, which is a continuation-in-part of application No. 15/382,413, filed on Dec. 16, 2016, now Pat. No. 9,904,893.

(60) Provisional application No. 62/542,440, filed on Aug. 8, 2017.

(51) Int. Cl.
| | |
|---|---|
| *H04L 29/06* | (2006.01) |
| *G06N 20/00* | (2019.01) |
| *G06N 3/08* | (2006.01) |
| *G06N 7/00* | (2006.01) |
| *G06F 21/55* | (2013.01) |

(52) U.S. Cl.
CPC ........ *H04L 63/1425* (2013.01); *G06F 21/552* (2013.01); *G06N 3/08* (2013.01); *G06N 7/005* (2013.01); *G06N 20/00* (2019.01)

(58) Field of Classification Search
CPC ...... H04L 63/1425; G06F 21/552; G06N 3/08
USPC ....................................................... 726/23
See application file for complete search history.

(56) References Cited

U.S. PATENT DOCUMENTS

| | | | |
|---|---|---|---|
| 8,418,249 B1 * | 4/2013 | Nucci | G06F 21/552 706/20 |
| 8,726,379 B1 | 5/2014 | Stiansen | |
| 8,762,298 B1 * | 6/2014 | Ranjan | G06N 5/02 706/12 |
| 9,037,404 B2 | 5/2015 | Ibrahim | |
| 9,043,905 B1 | 5/2015 | Allen et al. | |
| 9,075,990 B1 | 7/2015 | Yang | |
| 9,141,790 B2 | 9/2015 | Roundy et al. | |
| 9,148,441 B1 | 9/2015 | Tamersoy et al. | |
| 9,160,764 B2 | 10/2015 | Stiansen et al. | |

(Continued)

*Primary Examiner* — Jason K Gee
*Assistant Examiner* — Dereena T Cattungal
(74) *Attorney, Agent, or Firm* — Hulsey PC

(57) ABSTRACT

Disclosed is a method and system for detecting malicious entities and malicious behavior in a time evolving network via a graph framework by modeling activity in a network graph representing associations between entities. The system utilizes classification methods to give score predictions indicative of a degree of suspected maliciousness, and presents a unified graph inference method for surfacing previously undetected malicious entities that utilizes both the structure and behavioral features to detect malicious entities.

14 Claims, 9 Drawing Sheets

(56) References Cited

U.S. PATENT DOCUMENTS

| | | |
|---|---|---|
| 9,166,997 B1 | 10/2015 | Guo et al. |
| 9,256,739 B1 | 2/2016 | Roundy et al. |
| 9,261,601 B2 | 2/2016 | Ibrahim |
| 9,275,222 B2 | 3/2016 | Yang |
| 9,516,053 B1 | 12/2016 | Muddu et al. |
| 9,553,888 B2 | 1/2017 | Stiansen et al. |
| 9,559,804 B2 | 1/2017 | Ibrahim |
| 9,591,010 B1 | 3/2017 | Muddu et al. |
| 9,596,254 B1 | 3/2017 | Muddu et al. |
| 9,609,009 B2 | 3/2017 | Muddu et al. |
| 9,609,011 B2 | 3/2017 | Muddu et al. |
| 9,635,049 B1 | 4/2017 | Oprea et al. |
| 9,667,641 B2 | 5/2017 | Muddu et al. |
| 9,679,125 B2 | 6/2017 | Bailor et al. |
| 9,699,205 B2 | 7/2017 | Muddu et al. |
| 9,746,985 B1 | 8/2017 | Humayun |
| 9,813,435 B2 | 11/2017 | Muddu et al. |
| 9,813,444 B2 | 11/2017 | Yang |
| 9,823,818 B1 | 11/2017 | Ryan et al. |
| 9,825,986 B1 | 11/2017 | Bhatkar |
| 9,832,227 B2 | 11/2017 | Bhargava et al. |
| 9,838,410 B2 | 12/2017 | Muddu |
| 9,843,594 B1 | 12/2017 | Evans et al. |
| 9,843,596 B1* | 12/2017 | Averbuch ............ H04L 63/1416 |
| 9,866,528 B2 | 1/2018 | Cooper et al. |
| 9,882,876 B2 | 1/2018 | Cooper |
| 9,900,332 B2 | 2/2018 | Muddu et al. |
| 9,906,545 B1 | 2/2018 | Zhao et al. |
| 2008/0229415 A1* | 9/2008 | Kapoor ................... G06F 21/55 726/22 |
| 2013/0198119 A1* | 8/2013 | Eberhardt, III ........ G06N 20/00 706/12 |
| 2015/0128263 A1* | 5/2015 | Raugas ............... H04L 63/1408 726/23 |
| 2016/0359872 A1* | 12/2016 | Yadav .................... H04L 43/04 |

\* cited by examiner

METHOD AND SYSTEM FOR EMPLOYING GRAPH ANALYSIS FOR DETECTING MALICIOUS ACTIVITY IN TIME EVOLVING NETWORKS

CROSS-REFERENCE TO RELATED APPLICATIONS

This application claims benefit to U.S. Provisional Patent Application No. 62/542,440 filed Aug. 8, 2017 and is a continuation-in-part of U.S. Non-provisional patent application Ser. No. 15/821,231 filed Nov. 22, 2017, which is a continuation-in-part of U.S. Non-provisional patent application Ser. No. 15/382,413 filed Dec. 16, 2016 (U.S. Pat. No. 9,904,893), all of which are incorporated herein by reference.

FIELD OF THE DISCLOSURE

The present disclosure relates generally to cyber security systems; and more particularly to systems employing graph analysis for detecting malicious activity in time evolving networks.

BACKGROUND OF THE DISCLOSURE

Current security solutions face many challenges in protecting enterprises, including increasing data size and increasing attack complexity (number of sources, entities, relations, etc.). Electronic information across networks is a crucial aspect of enterprise or e-commerce systems. However, malicious or unauthorized use of these systems is on the rise, as evidenced by daily reports of breach and fraud, despite implementation of existing security systems.

Advanced persistent threats (APTs) which may target the exfiltration of critical data, typically comprise a series of steps including: infection, exploitation, command and control, lateral movement, and data exfiltration. The command and control phase, in which an attacker maintains a communication channel between an infected host inside the targeted organization and a remote server controlled by the attacker, may span weeks or months. However, despite its long duration, its detection in real-world organizations remains a great challenge. In fact, to further frustrate detection efforts, some attackers may not only minimize their footprint by combining active with stealthy phases, but also establish communication channels via unblocked services and protocols, therefore blending in with legitimate traffic. Since most organizations allow their employees to freely browse the Internet, web traffic is a very effective channel for attackers to communicate and maintain control over infected machines.

Descriptive studies show that, when analyzed over a period of several weeks, web-based command and control traffic patterns exhibit distinctive network profiles, with the frequency and network profile being dependent on the specific threat, or malware family involved in the attack. For example, infected machines may periodically attempt to communicate with the remote server(s), and may generally establish lightweight connections in which they receive new instructions. In a minor fraction of these connections, the infected machine will download a larger amount of data, corresponding to a software update.

However, most machine learning-based attempts to detect command and control focus on the analysis of individual connections. Given the large volume of data generated today at most organizations' perimeters and the number of entities that need to be monitored and analyzed, it is a great challenge to train models with behavioral patterns observed over weeks of data. In fact, depending on the organization size and activity, perimeter devices such as next generation firewalls may typically generate up to 1 TB of log data and involve tens of millions of entities on a daily basis.

As such, there is a need for improved cyber security system, and particular for security systems capable of handling large volumes of data, and detecting threat patterns exhibited over extended periods of time.

BRIEF SUMMARY OF THE DISCLOSURE

The present disclosure provides a method and system for detecting malicious entities and malicious behavior (e.g. malicious communication patterns) using graph algorithms in a time evolving network. In embodiments, the disclosed approach models activity via a network graph representing communication between hosts and destinations, and introduces a unified graph inference method for malicious entity detection that utilizes both the structure (e.g. relations in communication patterns) and features (entity behavior) of the network, according to various embodiments. Furthermore, the approach utilizes Bayesian network and neural network classification methods for the inference of related malicious entities and the classification of malicious behavior.

The disclosed method and system was tested on both publicly available data as well as event log data collected at a large global enterprise to demonstrate scalability and effectiveness. These experiments demonstrated the system's capability in analyzing large data volumes across multiple log sources and its scalability to handle event volume typically seen in large enterprises. Furthermore, taking into account behavioral feature vectors and utilizing neural network classification methods according to the disclosed approach, resulted in significantly higher detection rates and lower false positive rates compared to existing security methods. Testing of the disclosed method further demonstrated its ability to detect previously undetected malicious activity and malicious entities (hosts or domains) days or weeks before detection by threat intelligence feeds or other security solutions of existing cybersecurity systems. Moreover, both the high coverage rate and low error rate in the detection method continuously improves as more feedback is given by security analysts.

According to various embodiments, the present disclosure provides a system for detecting malicious activity in a time evolving network, comprising: a feature extraction step for extracting entities and behavioral features of the entities from log data, the behavioral features including communication patterns of the entities; a graph construction step for constructing an entity-behavior graph, which is an instance of a Bayesian Network, wherein: entities are represented as nodes in the graph, associations between entities are represented as edges in the graph, and each of said nodes and/or edges are associated with behavioral features derived from the log data; a graph-seeding step comprising labeling the graph with information regarding a malicious status of a subset of the nodes and/or edges represented in the graph, such that the graph comprises a labeled set of nodes and/or edges and an unlabeled set of nodes and/or edges; and a graph-processing step comprising inferring a malicious status for the unlabeled nodes represented in the graph, according to a malicious inference method, said malicious inference method comprising: determining a malicious status of unlabeled edges having at least one labeled node, and labeling these edges with edge probabilities, wherein a group of edges remains unlabeled, using a classification algorithm to predict an edge probability of maliciousness for each of the unlabeled edge of said group, adjusting the predicted edge probability for each edge in said group if there is a feature vector similarity between that edge and a labeled edge which is in a same neighborhood as the edge in said group, assigning edge potential functions based on the edge probabilities, and running belief propagation on the graph to infer a malicious probability for each of the unlabeled nodes.

In various aspects, the system further comprises performing a normalization step and/or a correlation step on the log event data. In further aspects, the resulting normalized log data is used as input to an outlier detection method to determine anomalies or outliers in behavior. In further aspects, the graph-seeding step comprises determining a malicious status for labeling nodes and/or edges by using: predictive modeling on the log data, external threat intelligence predictions, or a combination thereof. In further aspects, the graph-seeding step comprises using predictive modeling to determine a malicious status for each entity to surface to the security analyst for the purpose of receiving feedback in the form of labels, where said malicious status comprises a score indicative of a degree of suspected maliciousness. In yet further aspects, the graph-processing step comprises a graph-pruning step, a graph context step, a feature vector normalization step, or a combination thereof.

In various aspects, the system comprises generating and displaying a first set of predictions based on the degree of suspected maliciousness according to the malicious inference method, wherein said graph-processing step further comprises an analyst feedback step, said analyst feedback step comprising obtaining analyst feedback regarding said first output, wherein said analyst feedback comprises confirming, rejecting, and/or modifying the malicious predictions of said output. In further aspects, the analyst feedback step further comprises generation of malicious scores for entities with neighboring relationships to the labeled/predicted entities, a graph clustering step, comprising clustering the output generated according to the malicious inference method, wherein clustering comprises grouping entities presented in the output according to a logic which facilitates analyst investigation. In yet further aspects, the analyst feedback step further comprises a visualization step comprising of a rendered graph with nodes representing entities in which the malicious/suspicious entities are highlighted, with edges representing relations between said entities in which malicious/suspicious behaviors are highlighted, and additional context details displayed upon selection of said entities or said relations. In yet further aspects, the system continuously infers additional suspicious/malicious entities as the analyst provides feedback, comprising iteratively running belief propagation to assign scores representing degree of suspected maliciousness for additional entities based on analyst feedback.

According to various embodiments, the present disclosure provides a cybersecurity system, comprising: extracting behavioral features based on log data relating to active entities in a time evolving network; determining a malicious status of a subset of said entities, resulting in a subset of said entities constituting labeled entities and the remaining of said entities constituting unlabeled entities; determining a relationship structure between said entities based on association links between the entities, wherein behavioral features are assigned to each of said entities and each of said association links; determining a malicious status of a subset of said association links, resulting in a subset of the association links constituting a first group of links which are labeled and the remaining of said links constituting a second group of links which are unlabeled; using a classifier to make predictions of maliciousness for the second group of unlabeled links; and adjusting the predictions of maliciousness for the second group of links based on a comparison between feature vectors of the first group of links and feature vectors of the second group of links which are in a same neighborhood, wherein said neighborhood is determined based on said relationship structure between said entities. In some aspects, the system further comprises representing the entities and links in a network graph, wherein entities are represented by nodes in the graph, and wherein links are represented by edges in the graph. In other aspects, using a classifier to make predictions of maliciousness comprises using a probabilistic classifier to predict a probability of maliciousness for said edges represented by said second group of links in the graph, wherein adjusting the predictions of maliciousness for the second group of links comprises increasing the predicted probability of maliciousness for said edges represented by said second group of links based on a similarity between said feature vectors of the first group of links and feature vectors of the second group of links, the system further comprising assigning edge potential functions based on the predicted and/or adjusted probabilities of maliciousness, and running belief propagation on the graph to estimate a malicious probability for the nodes and edges on the graph. In further aspects, determining a malicious status of a subset of entities comprises using predictive modeling on the log data, using predetermined predictions, or a combination thereof; and determining a malicious status of a subset of said association links comprises using predictive modeling on the log data, using predetermined predictions, determining a malicious status of at least one entity forming the association link to determine a malicious status of that link, or a combination thereof.

In yet further aspects the classifier is a logistic regression and/or neural network classifier. In yet further aspects, the system further comprises training said classifier.

According to various embodiments, disclosed is an apparatus configured for identifying and detecting threats to an enterprise or e-commerce system, said apparatus comprising: one or more processors, system memory, and one or more non-transitory memory units; a user interface in communication with at least one user interactive device, wherein data may be input to and/or output from the apparatus through the user interface, the user interactive device comprising a keyboard, visualization screen, touchscreen, or combination thereof; a features extraction module comprising code stored on the one or more non-transitory memory units that when executed by the one or more processors are configured to group log lines belonging to one or more log line parameters and then compute one or more features from the grouped log lines; a normalization module adapted for normalizing the features data; a correlations module adapted for correlating the normalized data; a graph construction module, which comprises code stored on the one or more non-transitory memory units that when executed by the one or more processors are configured to construct an entity behavioral graph based on the grouped features, the entity-behavioral graph including nodes representing entities and edges representing associations between the entities; a graph-processing module, which comprises code stored on the one or more non-transitory memory units that when executed by the one or more processors are configured to infer maliciousness of entities represented in the graph, wherein the graph-processing module comprises a malicious Inference module, wherein the malicious Inference module is configured to employ a probabilistic classifier to predict a probability of maliciousness for entities represented in the graph, wherein the pre-processed graph includes a set of labeled and unlabeled entitles, and labeled and unlabeled edges, wherein, the malicious inference module is further configured to adjust a probability of maliciousness for unassigned edges based on a similarity between a feature vector of a labeled edge and an unlabeled edge in the same neighborhood of the labeled edge, wherein, the malicious inference module is further configured to assign edge potential functions based on the assigned probabilities of maliciousness to the edges, and wherein, the malicious inference module is configured to employ belief propagation to estimate the malicious probability of all nodes on the graph. In some aspects, the graph-processing module is configured to present results generated via the malicious inference module to a visualization screen of the at least one user interactive device through the user interface.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGUREs and examples are not meant to limit the scope of the present subject matter to a single embodiment, but other embodiments are possible by way of interchange of some or all of the described or illustrated elements and, further, wherein.

Figure 1:
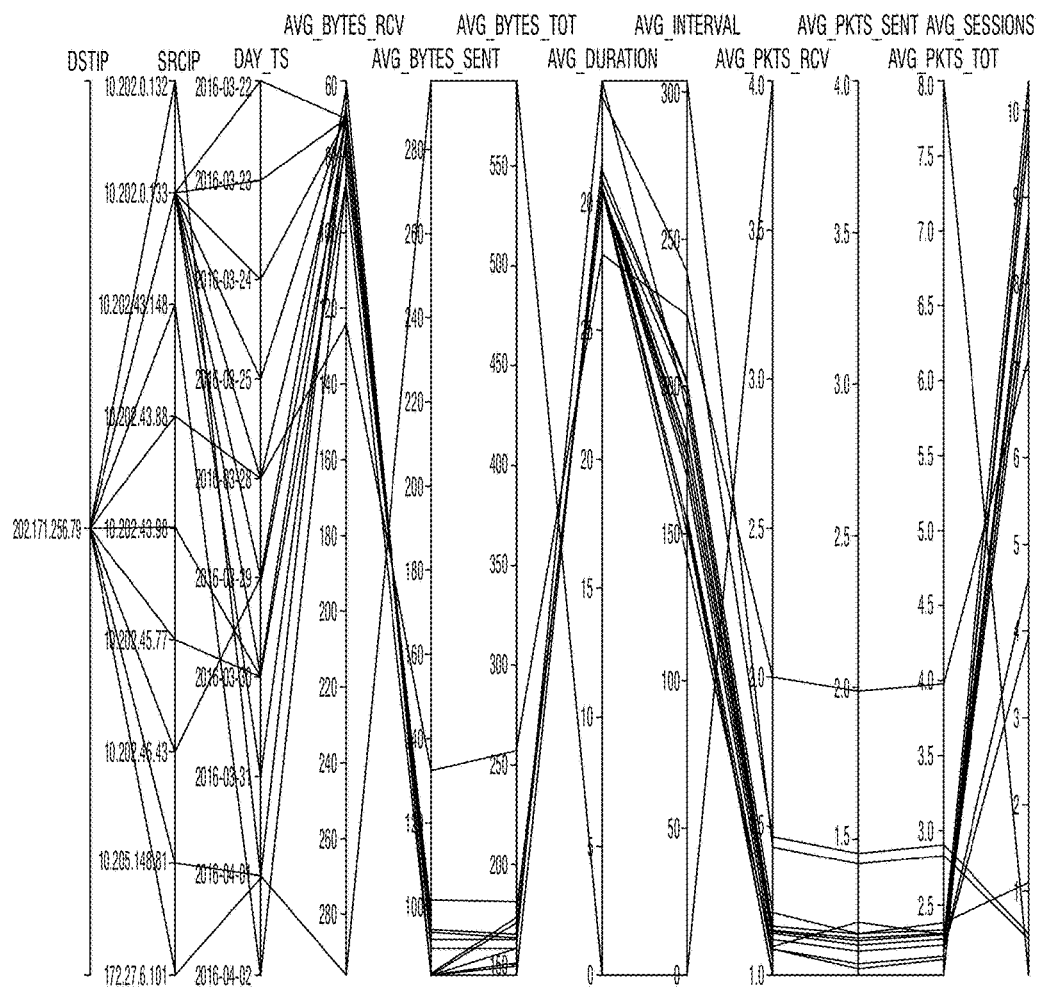
FIG. 1 is a Parallel coordinates plot showing daily network profile for connections between a single external IP and a set of 9 internal IPs.

While the disclosure is subject to various modifications and alternative forms, specific embodiments thereof are shown by way of example in the drawings and the accompanying detailed description. It should be understood, however, that the drawings and detailed description are not intended to limit the disclosure to the particular embodiments. This disclosure is instead intended to cover all modifications, equivalents, and alternatives falling within the scope of the present disclosure as defined by the appended claims.

DETAILED DESCRIPTION OF ILLUSTRATIVE EMBODIMENTS

The detailed description set forth below in connection with the appended drawings may be intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present subject matter encompasses present and future known equivalents to the known components referred to herein by way of illustration. Although the method and system for employing graph analysis for detecting malicious activity in time evolving networks here disclosed have been described in detail herein with reference to the illustrative embodiments, it should be understood that the description may be by way of example only and may be not to be construed in a limiting sense. It may be to be further understood, therefore, that numerous changes in the details of the embodiments of the disclosure will be apparent to, and may be made by, persons of ordinary skill in the art having reference to this description. It may be contemplated that all such changes and additional embodiments are within the spirit and true scope of this disclosed method and system as claimed below.

According to various embodiments, the present disclosure introduces a cybersecurity method and system utilizing a graph framework for detecting malicious activity, and/or malicious entities in a time evolving network. The present disclosure applies to various types of networks and various types of systems operating over such networks (e.g. large enterprise environment, e-commerce system, and the like).

According to various embodiments, inferring malicious behavior and malicious entities may comprise representing and analyzing heterogeneous entities and their relations in a graph that simultaneously models the link structure of the network as well as the behavior patterns of individual entities. By modeling both the behavior of heterogeneous entities and the relationships between them in a unified manner, complex patterns may be revealed, that may not otherwise be found.

Accordingly, to various embodiments, the disclosed method and system utilizes event log data to build a network graph representing patterns and features on both nodes and edges.

In embodiments, the underlying network graph captures communication patterns and associations between hosts in the enterprise and destinations visited. In embodiments, the graph is seeded with information regarding malicious entities; such information on malicious entities may be obtained by various data modeling technique(s), from threat intelligence feeds, and/or from independent security analysis. In embodiments, the graph may further be seeded with information regarding malicious communication patterns and/or associations, which may be similarly obtained. In embodiments, belief propagation is performed on the resulting graph, which then generates an estimated probability of maliciousness for all of the unlabeled entities based on relevant relationships/associations to the labeled entities.

Thus, according to various embodiments, the disclosed approach constructs an entity graph utilizing seed information on entities and then performs belief propagation to estimate marginal probabilities of maliciousness for the remaining unlabeled entities. In embodiments, seed information regarding communications/associations between the entities may further be used. According to various embodiments, the disclosed method and system uses the features of entities together with behavior patterns of the communications. This achieves higher accuracy with similar computational performance in comparison to using entity relations alone, ignoring the features of entities and behavior patterns of the communications.

Moreover, the unification of a graph-based and a feature-based approach into a single framework, results in a more robust method, which allows statistical interpretation of the results and does not require additional steps of combining results from separate methods.

In embodiments, the disclosed method and system utilizes neural network classifiers, as this was experimentally found to consistently outperform random forest classifiers on the tested feature sets and to yield improved accuracy in detecting new malicious domains.

According to various embodiments, the disclosed method and system provides for features capturing query patterns on edges, which allows for features on both nodes and edges if available.

Thus, the disclosed framework provides an improved cybersecurity method, as it incorporates multiple sources of security logs, scales to perform well on datasets from large enterprise environments, and continuously improves as more feedback is given by security analysts.

Advantage of Using Time Evolving Graph Analysis in Cybersecurity:

The need for the disclosed graph analysis method can be illustrated, for example, by the following two real-world use cases: delivery and command and control. These two use cases correspond to different stages of advanced persistent threats (APTs). Generally, APTs are targeted, multi-stage attacks comprising the following steps: delivery, exploitation, command and control, lateral movement, and data exfiltration (see "Adversarial tactics, techniques & common knowledge" [Online], Available: https://attack.mitre.org; and A. Sood and R. Enbody, "Targeted Cyber Attacks: Multi-staged Attacks Driven by Exploits and Malware," 1st ed. Syngress Publishing, 2014).

A. Delivery

The delivery stage of APTs corresponds to the first compromise or infection of a resource of the targeted system (e.g. organization). According to various embodiments, the disclosed method and system comprises detecting malicious sites at the delivery stage, via web traffic. This may include detection of malicious sites that perform a "drive-by-exploit" (i.e. exploiting a vulnerability without the user knowledge), a drive by-download (i.e. causing the unintentional download of malicious files), and/or simply trick users to download and execute malicious files (e.g. by advertising fake updates or upgrades).

To avoid these threats, including exploits and both the intentional and unintentional download of malicious files, organizations may attempt to block traffic to IP addresses or domains, which are blacklisted as malicious. In practice, given that virtual hosting providers often host hundreds of domains in a single IP address, organizations may typically prefer to block web communications at the domain level to reduce false positives (blocking legitimate connections). While blacklists of domains are updated frequently, attackers typically manage to bypass them by using short-lived domains, often associating the new domains to a previously used IP address.

To illustrate an attackers' possible strategy, shown in Table I is a series of connections established to delivery sites in a span of 6 consecutive days.

TABLE I

SERIES OF CONNECTIONS ESTABLISHED TO DELIVERY SITES IN A SPAN OF 6 CONSECUTIVE DAYS

| Date | Internal•Ip | External•IP | Domain |
| --- | --- | --- | --- |
| Mar. 22, 2017 | $S_1$ | 34.198.152.6 | nofreezingmac.space |
| Mar. 22, 2017 | $S_1$ | 34.198.152.6 | nofreezingmac.com |
| Mar. 22, 2017 | $S_1$ | 34.198.152.6 | nofreezingmac.click |
| Mar. 26, 2017 | $S_2$ | 212.83.135.167 | updatesoftwaresysforpcandmac.pro |
| Mar. 24, 2017 | $S_3$ | 212.83.135.167 | nowchecksysforpcandmac.pw |
| Mar. 26, 2017 | $S_4$ | 212.83.135.167 | neweasysofttoigetalwaysfree.online |
| Mar. 24, 2017 | $S_4$ | 209.58.144.145 | upgrade12checksysformacandpc.pw |
| Mar. 24, 2017 | $S_5$ | 209.58.144.145 | upgrade12checksysformacandpc.top |

Represented in Table I are examples of three different external IPs hosting malicious sites. Two of the IPs (34.198.152.6 and 212.83.135.167) host three malicious sites in the analyzed time span, while the remaining IP (209.58.144.145) hosts two different malicious sites (Internal IPs have been made anonymous).

As can be seen from the table, and as may typically be the case, the domains hosted in a same IP exhibit similarities. For example, as illustrated in Table I, the three domains associated to 34.198.152.6, and the two domains associated to 209.58.144.145, share the same second-level name, while presenting different top-level domains. Similarly, two of the domains hosted on IP 212.83.135.167 share the suffix "forpcandmac". In the foregoing example, the same internal IP (anonymized in the table and designated as s4) visited two different domains hosted on two different IPs in different days.

Thus, the present disclosure utilizes graph-based methods to analyze activity patterns of connected entities involved in malicious activities. Such activity patterns indicative of maliciousness may be based on the following: malicious external IPs often host several malicious sites; a machine that has been compromised or that may be used by a user with bad or unsafe browsing habits may be likely to repeatedly visit malicious sites; malicious domains exhibit similarities, since attackers keep registering new domains, but rely on the same social engineering strategies to trick users to visit malicious sites. Therefore, it is advantageous to consider not only the relations of the analyzed entities, but also their individual characteristics, or features.

B. Command and Control

Command and control (C&C) represents the APT stage in which a compromised host inside the targeted organization maintains a communication channel with a remote server controlled by the attacker. This phase of the attack can span weeks or months, and its detection requires significant sophistication. Savvy attackers may minimize their footprints by combining active and stealthy phases, and establish communication channels via unblocked services and protocols, therefore blending in with legitimate traffic. Since most organizations allow their employees to freely browse the Internet, web traffic may be a very effective channel for attackers to communicate with, and maintain control over compromised machines.

When data corresponding to command and control is analyzed over a period of time (e.g. over a period of several weeks), the communications may exhibit distinctive network profiles [see S. Garcia, V. Uhlir̆, and M. Rehak, Identifying and modeling botnet C&C behaviors, in Proceedings of the 1st International Workshop on Agents and CyberSecurity, ser. ACySE '14. New York, N.Y., USA: ACM, 2014, pp. 1:1-1:8].

In particular, compromised machines may periodically attempt to communicate with remote server(s), and repeatedly establish lightweight connections through which they receive new instructions. Moreover, in cases where multiple compromised machines communicate with the same C&C master, similar patterns of communication may be found between the compromised machines and the master.

As an example, FIG. 1 shows a network profile for communications between a set of 9 internal hosts/IPs and a single IP acting as a C2 master. A clear pattern emerges: the communications between 8 out of the 9 internal IPs and the destination IP exhibit a very similar network profile. These similarities include: all the connections depicted in the figure take place in a span of 9 consecutive days; there are between 7 and 10 daily sessions between each source IP and the destination IP; the average interval between sessions varies between 150 and 200 seconds; each session has a duration of roughly 30 seconds; each internal IP receives 80 bytes and sends 100 bytes per session; on average, the number of packets received and sent per session is very low (between 1 and 2).

In this example, graph analysis can be used in the following ways: first, any prior suspicion of the external IP (either via internal investigation or threat intelligence), can be used to flag the internal IPs communicating with it; second, by incorporating features describing the communications between each internal and external IPs, connected clusters exhibiting similar programmatic communications may be detected.

Figure 2:
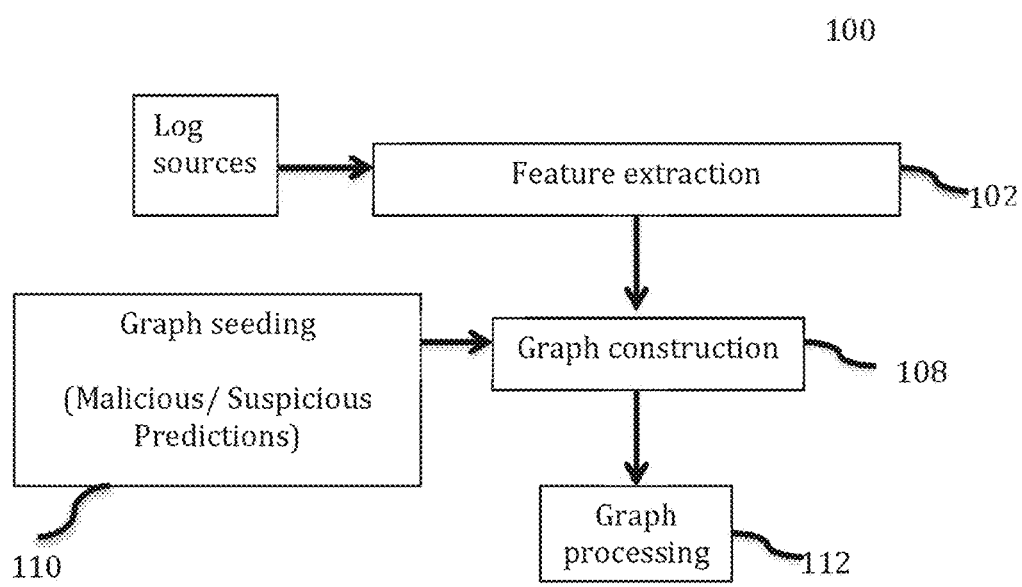
FIG. 2 is a block diagram illustrating a method for employing graph analysis for detecting malicious activity in time evolving networks, in accordance with various embodiments.
Figure 3:
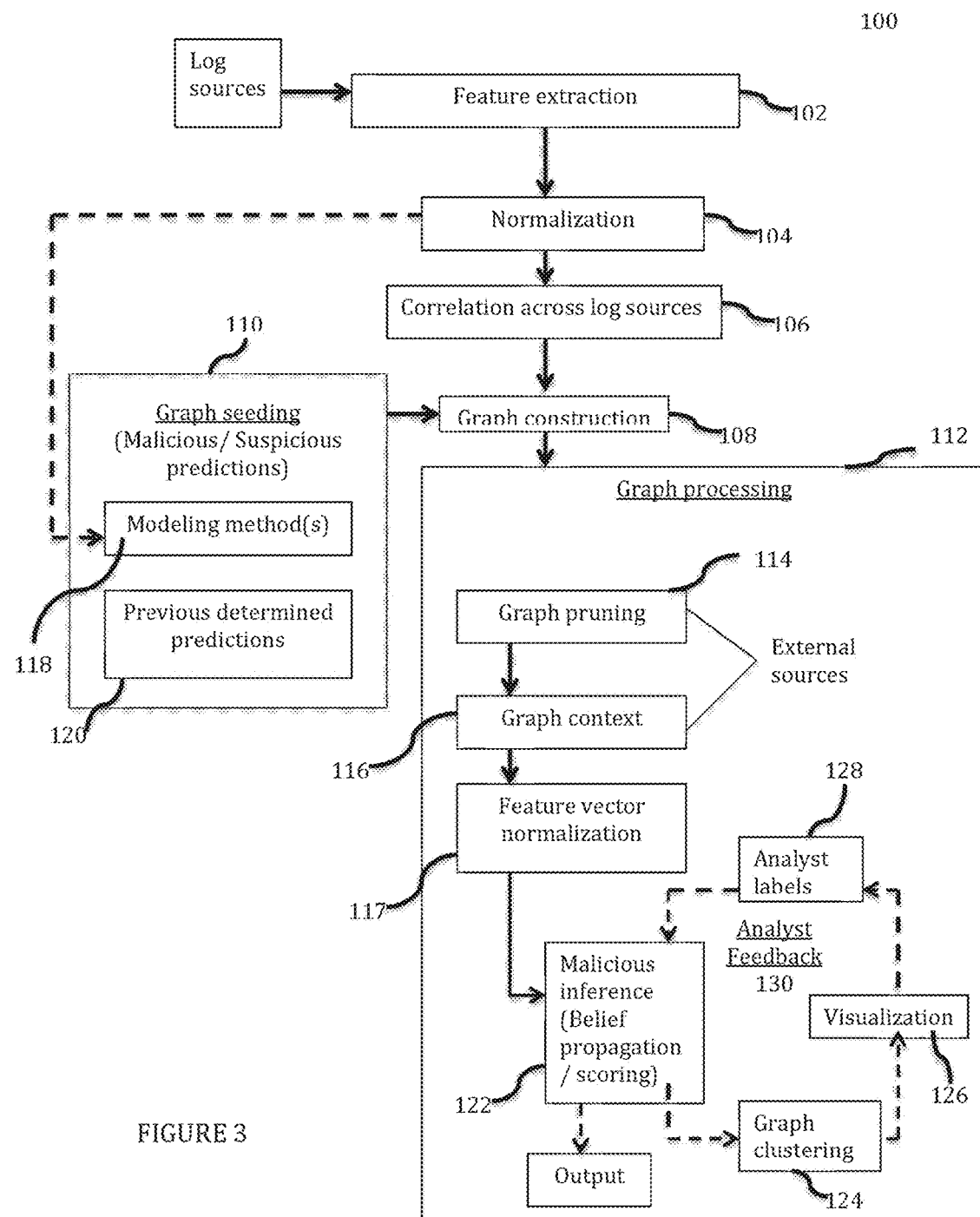
FIG. 3 is block diagram illustrating a detailed embodiment of the method shown in FIG. 2.

Method Employing Graph Analysis:

In accordance with various embodiments, FIGS. 2 and 3 are block diagrams illustrating a method and system employing graph analysis for detecting malicious activity in time evolving networks (System 100). The system 100 may be a cyber security method, and may be used for detection of APTs, according to various embodiments. As shown in the figures, system 100 comprises extraction of entities and behavioral features from log sources (feature extraction step 102); construction of an entity-behavioral graph (graph construction step 108); seeding the graph with information regarding a malicious status of a subset of entities represented in the graph, i.e. "malicious/suspicious predictions" (graph-seeding step 110); and processing of the entity-behavioral graph to estimate or infer maliciousness of entities represented in the graph (Graph-processing step 112).

In embodiments, feature extraction step 102 may be followed by normalization of the log data (normalization step 104) and/or correlation across log sources (correlation step 106), prior to graph construction step 108, as shown in FIG. 3.

In embodiments, malicious/suspicious predictions according to graph-seeding step 110 may be based on one or more predictive modeling method(s) 118 for generating malicious/suspicious predictions, and/or previously determined predictions 120, such as whitelisted and/or blacklisted entities.

In embodiments, graph-processing step 112 comprises inferring probability of maliciousness (Malicious inference method 122). In embodiments, method 122 may comprise using belief propagation. In further embodiments, method 122 may comprise generating a score indicative of a degree of suspected maliciousness (scoring).

In embodiments, graph-processing step 112 may further comprise modifying the graph based on information from external sources. This may comprise pruning the entity-behavioral graph (Graph pruning step 114) and/or adding information from external sources (such as WHOIS) to edges and vertices in the graph (Graph context step 116). In embodiments, graph-processing step 112 may further comprise normalizing feature vectors on all edges (Feature vector normalization step 117). In embodiments, Graph pruning step 114, Graph context step 116, and/or Feature vector normalization step 117 may precede malicious inference method 122.

In embodiments, an "output" may be generated based on malicious inference method 122. The output may be displayed on a visual screen, for example. In some embodiments, Graph-processing step 112 may further comprise obtaining input from an analyst regarding results generated according to malicious inference method 122 (analyst feedback step 130). Analyst feedback step 130 may serve to modify, confirm, and/or reject the results generated in method 122, according to various embodiments. In other embodiments, the "output" may be obtained following malicious inference method 122, which may be without analyst feedback.

In embodiments, analyst feedback step 130 may comprise clustering results generated according to malicious inference method 122 (Graph clustering step 124); generating a visualization of the results (visualization step 126); and/or labeling the results based on the analyst's feedback (analyst labels step 128). Additionally, steps 122, 124, 126, and/or 128 may be repeated multiple times; thus Analyst feedback step 130 may define a feedback loop, according to various embodiments.

Feature Extraction

As shown in FIGS. 2 and 3, processing begins with Feature extraction step 102 which comprises the extraction of entities and behavioral features (communication patterns) from log sources (i.e. logs of host domain communications). Embodiments of the present disclosure may process web logs, firewall logs, or a combination of the two. In a typical enterprise or e-commerce system, logs may be delivered in real, streaming time from widely distributed sources.

Typically, but not exclusively, web log analysis may facilitate the detection of web attacks. Typically, but not exclusively, mining firewall logs may facilitate the prevention of data ex-filtration in the enterprise or e-commerce setups.

In embodiments, feature extraction step 102 may include retrieving log data which may include the retrieval of log lines belonging to one or more log line parameters from one or more enterprise or e-commerce system data source and/or from incoming data traffic to the enterprise or e-commerce system. The one or more enterprises or e-commerce system data sources may comprise at least one of: web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. In some embodiments, next generation firewall logs may be retrieved for detection of a command and control attack at a network perimeter. The one or more log line parameters may comprise, for example, user ID, session, IP address, and URL query.

In embodiments, Feature extraction step 102 may include aggregating all the activity of each entity within a time window (e.g. 24-hours). In embodiments, extracted features may capture the network profile of the communications between two specific entities. In embodiments, information captured by the extracted features may include, but is not limited to information about the number of connections between two entities, the bytes sent and received per connection, the packets sent and received per connection, the duration of the connections, the intervals between connections, information about relevant ports, applications and protocols, and alerts raised by the firewall.

According to various embodiments, Feature extraction step 102 may be followed by Normalization of the log data, and correlation across log sources (steps 104 and 106. In some embodiments, normalized data may be processed according to predictive modeling method(s) 118, in order to generate malicious suspicious predictions for graph-seeding step 110. In embodiments, the processed data (for predictive modeling method 118) may be normalized but uncorrelated. Thus, according to various embodiments, normalized data may be used for both statistical modeling and the graph construction step 108, wherein the data would be correlated according to step 106 only for the graph construction step.

Graph Construction

According to various embodiments, graph construction step 108 may comprise constructing an entity-behavior graph representing relationships and associations between entities based on the log event data. In embodiments, the graph is an instance of a Bayesian Network. According to various embodiments, the constructed graph may be seeded with information (assigned "priors") regarding a malicious status of entities represented in the graph (malicious/suspicious predictions), according to graph-seeding step 110 (described in more detail below). In some embodiments, graph-seeding step 110 may comprise seeding the graph with information regarding a malicious status of relationships and/or associations between entities (edges) represented in the graph, or a malicious status of both entities and edges represented in the graph, according to various embodiments. Such information may include an indication of known maliciousness, non-maliciousness, and/or degree of suspected maliciousness (i.e. malicious scoring), which is assigned to a subset of the host/domain entities, according to various embodiments. Thus, labeling a subset of entities and/or edges in the graph according to Graph-seeding step 110 may allow for estimating the likelihood of maliciousness for all of the remaining unlabeled entities via inference, pursuant to graph-processing step 112, wherein for each entity "x", the estimated probability for that entity to be malicious may be denoted by "P(x)". (From a security perspective, this information may be used to extend existing known malicious entities by identifying additional sources of malicious activity, according to various embodiments).

In embodiments, the entity-behavior graph may comprise vertices or nodes representing users/sources/destinations (e.g. user accounts, internal IPs, external IPs, and/or domains). The graph may further comprise edges representing associations between two entities, such as a user logging into a machine, and/or communication between the two entities, such as source IP connecting to a destination IP. In embodiments, the graph may include both nodes and edges having attributes (feature vectors) based on activity (communication behaviors) recorded in the logs. In various embodiments, random variables represented in the constructed graph must satisfy the condition that any pair of nonadjacent nodes are conditionally independent from one another, conditioned on the neighborhood of either node. This is a key property of Bayesian Networks, which renders them a useful way to combine both graph theory and probability theory to represent probability distributions, allowing for probabilistic inference over random variables.

Graph-Seeding

According to various embodiments, the constructed entity-behavior graph may be seeded with malicious/suspicious predictions according to graph-seeding step 110. These predictions may be based on one or more predictive modeling method(s) 118 for generating malicious/suspicious predictions from the log source data extracted pursuant to step 102. In embodiments, the suspicious/malicious predictions may also be supplemented with external threat information 120, such as whitelists/blacklists. In embodiments, a combination of approaches (e.g. 118 and 120) may be used. Additionally, there may be overlap between the various approaches used (e.g. a blacklisted entity may have been previously determined based on a predictive modeling method).

In embodiments, predictive modeling method 118 may be performed in real time. In embodiments, predictive modeling method 118 may comprise statistical modeling of the log source data. This may include an outlier detection method (outlier analysis), such as described in U.S. Patent No. 9,904,893, which is incorporated herein by reference. In embodiments, the dataset may be labeled using a combination of outlier analysis and validation through domain experts, such as cybersecurity analysts. In embodiments outlier analysis may be performed on the feature data on a daily basis. Additionally, outliers may be investigated using VirusTotal ("VirusTotal" [Online], Available: https://www.virustotal.com), which aggregates the output of more than sixty antivirus programs and URL scanners. In embodiments, a domain may also be considered suspicious if it is found reported by at least one antivirus program or scanner, and/or if the domain was created less than a month before the observed activity.

According to various embodiments, predictive modeling of the log source data may comprise using data which is normalized according to normalization step 104, prior to statistical modeling of the data. In embodiments, such data may be normalized but not correlated for the Graph-seeding step 110; the same (normalized) data may also be processed through correlation step 106 for graph construction, as illustrated in FIG. 3.

For clarity, it is noted that modeling method 118 is distinct from the underline graph construction/graph-processing steps (108/112) of the present disclosure, as steps 108/112 provide an inference-based approach for determine maliciousness of unsuspected entities based on relationships and/or similarities with entities that may be labeled via method 118, according to various embodiments.

In embodiments, previously determined predictions 120 for graph-seeding step 110 may be based on information obtained from whitelists (e.g. Alexa), and/or malicious domain labels from blacklists (e.g. VirusTotal), and the like.

In embodiments, malicious/suspicious predictions may be automatically seeded into the graph, through processing of system 100 and/or entered into the constructed graph, (e.g. by a security analyst).

In embodiments, malicious/suspicious predictions may be represented according to a status indication which may include a suspicious, malicious, and/or a normal indication. In embodiments, malicious and suspicious status indications may include a score. Such score may be, based on a numerical scale, for example (e.g. from 0.1 to 0.99, where 0.99 indicates a highly malicious state). In embodiments, such a score may be generated by predictive modeling method(s) 118. In other embodiments, a score for previously determined predictions 120 may comprise assigning a score of 0.99 to a blacklisted entity and/or having an analyst determined score, according to various embodiments.

Graph Processing

In embodiments, graph-processing step 112 provides an inference-based approach for determining the malicious status of entities represented in the constructed graph using a probabilistic graphical model. This may comprise estimating a likelihood of maliciousness for the represented entities, wherein for each entity, x, the estimated probability for that entity to be malicious may be designated by "P(x)". In embodiments, graph-processing step 112 may include surfacing new suspicious/malicious predictions and/or estimating a likelihood of maliciousness for entities which do not carry malicious labels from graph-seeding step 110. According to various embodiments, estimating a likelihood of maliciousness according to graph-processing step 112 may comprise malicious inference method 122. In embodiments, malicious inference method 122 may include assigning a maliciousness "score" to newly predicted entities (scoring).

In some embodiments, graph-processing step 112 may comprise Graph pruning step 114, Graph context step 116, and/or Feature vector normalization step 117. In embodiments, steps 114, 116, and 117 may precede malicious inference method 122.

In some embodiments, graph-processing step 112 may further comprise analyst feedback step 130 following an initial performance of malicious inference method 122. Analyst feedback step 130 may include Graph clustering step 124, visualization step 126, and/or analyst labels method 122, according to various embodiments.

Graph Pruning

In embodiments, graph-pruning step 114 may be performed on the constructed graph to identify and discard nodes that are unlikely to improve and may even skew classifier results. This may comprise filtering out high-reputation and/or popular domains, which may be on whitelists, such as ALEXA ("Alexa", http://www.alexa.com/topsites/, 2009), which is a commonly used whitelist source in cybersecurity research and analysis. In embodiments, the filtered domains may include domains listed in the top 10,000 whitelist (as reported by Alexa, for example). In embodiments, in order to prevent the whitelisting of any potentially malicious domains that are popular due to the breadth of attack, graph-pruning step 114 may filter out only those domains that remain in the top 10,000 list over several days. In embodiments, graph-pruning step 114 may filter out domains that are very popular in the network environment and which may be visited by almost all of the machines in the enterprise. This filter overlaps significantly with the filter for the top Alexa ranked domains, but may also filter out enterprise-specific domains that are frequently visited (such as the organization's website, for example).

Graph Context

In embodiments, context information may be added to the graph according to Graph context step 116. In embodiments, the context that is added may come from external sources, such as "WHOIS", which may provide information about parties responsible for a domain name or IP address. Often, malicious domains in firewall logs are active for only very short time, and are sometimes not registered. However, this information may be found in external sources such as WHOIS. For example, this additional context may include the following fields:

Registered: Yes/No
Registration Age: # days/months
Registrar: ***********
Registrar ID: ***********
Updated Date: 2018-01-13 11:10:25
Creation Date: 2018-01-08 11:01:24
Registry Expiry Date: 2019-01-08 11:01:24
Registry Registrant ID: ***********
Registrant Name: ****************
Registrant Street: ***************
Registrant City: ***************
Registrant State/Province: ***************
Registrant Postal Code: -
Registrant Country: ***************
Registrant. Phone: ***************
Registrant Fax: ***************

Malicious Inference

According to various embodiments, malicious inference method 122 provides an approach for detecting malicious activity, given an entity-behavioral representation (e.g. a Bayesian Network) of host-domain communications according to a probabilistic graphical model.

As described above, the constructed graph may comprise vertices representing source/destinations and edges representing associations between source and destination, according to various embodiments. Additionally, both nodes and edges of the constructed graph may have attributes (features) based on communication behavior recorded in the logs. Furthermore, random variables represented in the constructed graph must satisfy the condition that any pair of nonadjacent nodes are independent from one another conditioned on the neighborhoods of the nodes, according to various embodiments.

According to various embodiments, malicious inference method 122 may comprise estimating marginal probabilities in the graph using belief propagation (BP). BP is a fast and approximate technique to estimate marginal probabilities (see J. Yedidia, W. Freeman, and Y. Weiss, "Understanding belief propagation and its generalizations," International Joint Conference on Artificial Intelligence, 2001). Additionally, BP is believed to scale well to large graphs, having time and space complexity that is linear in the number of edges in the graph. In embodiments, malicious inference method 122 uses BP on the constructed Bayesian Network, as the combined approaches allow for node/edge features to be incorporated into the probabilistic inference framework. It is noted, however, that the disclosed method is not necessarily limited to belief propagation and may employ other techniques to propagate an indication of maliciousness, such as labeled propagation or score propagation, according to various/alternate embodiments.

According to various embodiments, Malicious inference method 122 estimates a likelihood of maliciousness for unlabeled entities in the constructed graph via inference, wherein a subset of the host/domain entities are labeled (i.e. assigned priors according to graph-seeding step 110). Thus, for each entity x the probability of the entity to be malicious may be designated by P(x).

This approach takes into account the structure of the graph which may include the structure of the underlying communication patterns and/or IP associations (e.g. shared IPs) for predicting malicious behavior. For example, in a Command & Control type attack, infected hosts often query malware-controlled domains in the command and control (C&C) stage of infection. Moreover, hosts infected with the same malware family often query the same sets of malware control domains, and these malware-control domains often are registered exclusively for the purpose of C&C. Therefore, any hosts querying such known domains may be treated as potentially malicious.

In considering a network graph constructed according to step 108, suppose a node "x" is involved in a known malicious communication to entity "s" and that the communication pattern of edge (x, s) is very similar in terms of extracted features to the communication patterns with multiple entities $(x, s_1), (x, s_2) \ldots (x, s_k)$. Then, the knowledge that all of these communications originate from a single source may be used to increase the priors assigned to the edges $(x, s_1), s_2) \ldots (x, s_k)$. However, a straightforward classification algorithm would typically ignore this structure and focus only on the feature vector similarity between (x, s) and $(x, s_1), s_2) \ldots (x, s_k)$, disregarding the information of the shared source. In contrast, Graph-processing step 112 utilizes this structural information by increasing priors based on the similarity between communication patterns in neighborhoods of each entity, according to malicious inference method 122.

According to various embodiments, in a Bayesian Network constructed according to step 108, each node and edge may represent a random variable that can be in one of two states: benign or malicious/suspicious. In embodiments, a malicious/suspicious state may include a "score" indicating a degree of suspected maliciousness or likelihood of maliciousness.

The structure of the Bayesian Network may capture joint probability distributions, where the edges of the graph may define the dependencies (associations) between random variables. In embodiments, the marginal probability distribution $2(x_i)$ of a node $x_i$ may be defined in terms of sums of the joint probability distribution over all possible states of all other nodes in the graph. While this sum contains an exponential number of terms, BP may be used to approximate the marginal probabilities of all nodes in time linear in the number of edges, wherein the priors on nodes may be based on labels from security analyst investigations as well as established security whitelists and blacklists, and/or may be determined according to various modeling method(s), as outlined above.

In embodiments, performing belief propagation computation also depends on edge potential functions that capture the distributions of adjacent nodes. That is, for each edge (i, j), the probability of i being in state xi, and j being in state xj, may be given by the edge potential function ψij (xi, xj). These edge potential functions may be defined based on the predicted probability of the edge to be malicious as follows: For adjacent nodes xi and xj, let P ((xi, xj)) be the malicious prediction probability given by the output of a probabilistic classifier for edge (xi, xj). Intuitively, if P ((xi, xj)) is close to 1, then the communication has been classified as likely malicious, so one of the entities i or j is likely to be malicious and the potential function is assigned as follows:

$\psi_{ij}(x_i=\text{Benign}, x_j=\text{Benign})=1-P((x_i, x_j))$ and $\psi_{ij}(x_i, x_j)=P((x_i, x_j))/3$ for the other state pairs $(x_i, x_j)$.

A suitable probabilistic classifier may be determined by comparing results from different classifiers, such as logistic regression and neural network classifiers, according to various embodiments.

Figure 4:
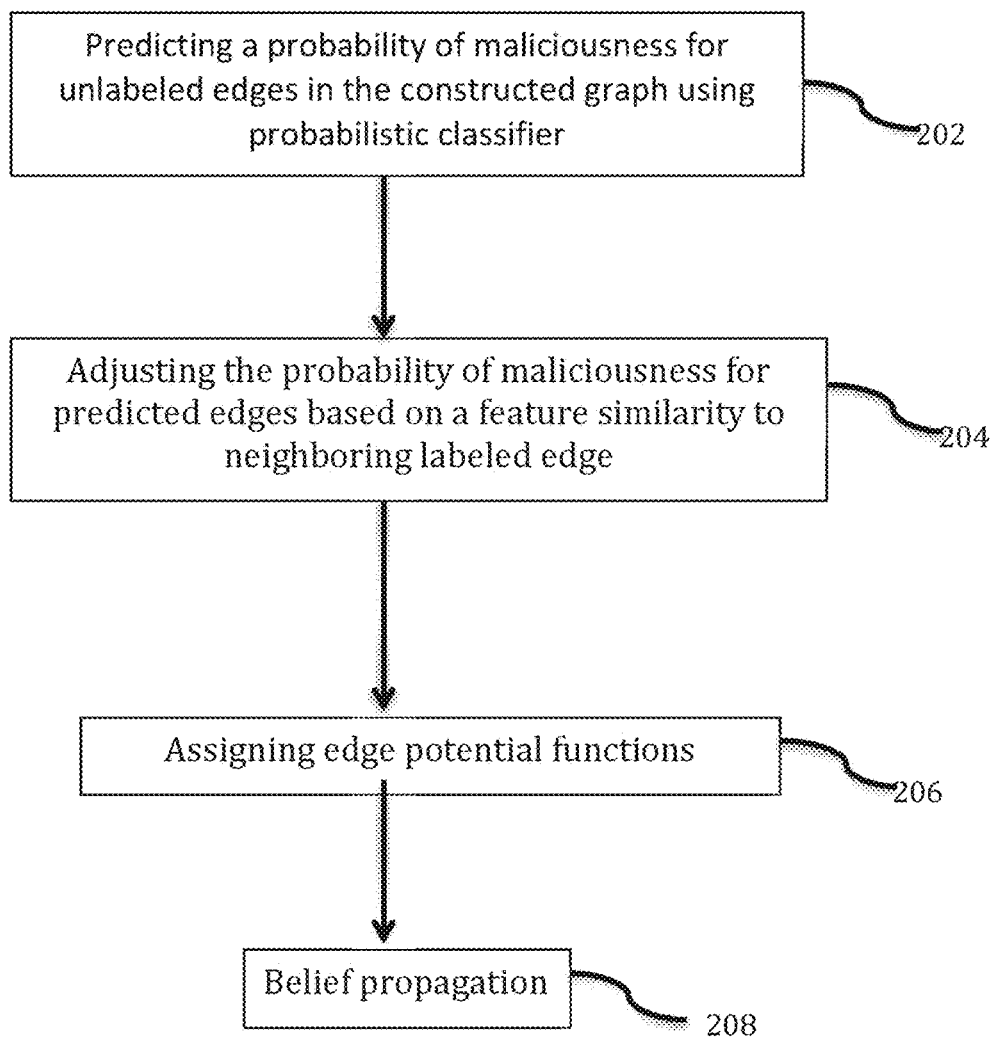
FIG. 4 is a block diagram illustrating an approach for inferring malicious probability for the method of FIG. 2.

FIG. 4 illustrates an exemplary approach for inferring a malicious status and/or malicious probability for entities and specific communications in the Entity/Relation graph according to Malicious inference method 122, wherein entities are represented in the graph by nodes and associations between specific entities (e.g. communications between entities, common IP(s), etc.) are represented in the graph by edges, and wherein each node (x) has an N(x) set of adjacent edges.

As shown in the figure, Malicious inference method 122 may comprise: Using a classifier to make a malicious predictions for unlabeled edges in the constructed graph (Step 202). This may comprise using a probabilistic classifier to predict a probability of maliciousness P(e) for unlabeled edges in the constructed graph, wherein labeled edges may include any edge comprising at least one entity predicted as malicious, according to various embodiments. In some embodiments, the labeled edges may also be determined by predictive modeling and/or external threat intelligence predictions.

In embodiments, inference method 122 may further comprise assessing and/or adjusting the malicious status prediction for edges predicted in step 202 by comparing to a feature vector of a labeled edge (step 204). This may comprise adjusting the predicted probability of maliciousness for edges predicted in step 202 based on a similarity between a feature vector of a labeled edge and the predicted edge in the same neighborhood of edges. In embodiments, this may comprise increasing the probability predicted in step 202. According to various embodiments, step 204 may comprise considering, for each node x, any edge e in N(x) that is predicted, and computing the distance between the feature vector of e and the feature vector of every labeled edge f in the neighborhood of e, wherein, if the computed distance "d" lies below a threshold value, then assigning the following probability of maliciousness to edge f:

max{P(f), 1−d}, where P(f) is the probability computed in Step 202.

The threshold value may be chosen based on previous experiments, according to various embodiments.

In embodiments, neighborhood(s) in the graph may be determined by the relationship structure of the graph which is based on associations or association links between the entities. Such association links may be represented as edges in the Entity/Relation graph and may be based on a communication event(s) between specific entities, and/or other association between the entities, according to various embodiments. In embodiments, the neighborhood of each node x is comprised of the set of edges N(x) adjacent to x.

In embodiments, the second-degree neighborhood of each node x is comprised of the set of edges N(N(x)) which are adjacent to any neighbor of x but is not a neighbor of x itself. Similarly, it is possible to extend this to define third-degree neighborhoods, fourth-degree neighborhoods, and so on, according to various embodiments.

In embodiments, inference method 122 may further comprise performing propagation on the graph (step 208). This may comprise running belief propagation on the graph to estimate the malicious probability of all nodes, wherein edge potential functions "$\psi_{ij}(x_i, x_j)$" may be assigned (step 206) based on the edge probabilities output in Step 204 prior to running belief propagation.

Thus, the method 122 may output inferred probability of maliciousness for entities (nodes) as well as for specific communications (edges).

In embodiments, the above approach may also be used to train a classifier, select a classifier, adjust/tune an existing classifier, and/or validate the approach. For this purpose, steps 202 and 204 may be carried out as follows: Step 202 may comprise providing training and test edges; taking the union of training and test edges and considering each connected component "C" of the resulting graph to train a classifier on all of the training edges of C; and assigning a probability of maliciousness P(e) for each test edge e in C. Accordingly, step 204 may comprise considering, for each node x, any edge e in the neighborhood N(x) that lies in the training set, and computing the distance between the feature vector of e and the feature vector of every test set edge f in at least N(x), wherein, if the computed distance "d" lies below a threshold value, then assigning the following probability of maliciousness to edge f:

max{P(f), 1−d}, where P(f) is the probability computed in Step 202.

In embodiments, the entity/relation graph analyzed according to Malicious inference method 122 may be processed through Graph pruning step 114, Graph context step 116, and/or Feature vector normalization step 117, which may be carried out prior to step 202.

In embodiments, the classifier used in step 202 may be a logistic regression classifier and/or neural network classifier. In embodiments, results from different classifiers may be compared in step 202, in order to select a suitable classifier. (As discussed in the Results section of this disclosure below, a logistic regression classifier was compared with a neural network classifier to predict the probability that an entity or specific communication may be malicious, and found that a neural network classifier which uses two hidden layers with rectified linear units outperformed the logistic regression classifier).

In embodiments, step 208 may comprise employing a message passing based inference method to determine the probability of maliciousness under a probabilistic graphical model (see P. Manadhata, S. Yadav, P. Rao, and W. Horne, "Detecting malicious domains via graph inference," ESORICS, Part I, LNCS 8712, vol. 4, no. 3, pp. 1-18, 2014). Belief propagation is considered a suitable approach because of the scalability of approximate estimation algorithm in Spark GraphFrames, and because of the interpretability of the results as probabilities. In embodiments, a belief propagation algorithm is implemented as an iterative message passing algorithm: messages are initialized at every node, and at each step, messages are read from all neighbors, then a marginal probability is computed based on these messages and its belief is then updated to all neighbors. By leveraging the probabilistic classifier from Step 202, a complete model for probabilistic inference of malicious entities and communications may be built.

Since the ground truth for the botnet dataset includes labels for edges only, the disclosed malicious inference method was able to be validated on predictions of maliciousness for the edges, but not for hosts or destination IPs. However, as the goal of a security defense system is to detect malicious behavior and prevent its spread, it may be also necessary to pinpoint the hosts or destination IPs which are the sources of the malicious activity. By performing this final step of pinpointing the sources of maliciousness, it may be possible to take action in the form of a security response to re-image a malicious host or add a malicious domain to a blacklist. These actions would not be possible if only malicious communications are inferred without taking the further step of finding the sources of the malicious activity.

Analyst Feedback

Analyst feedback step 130 comprises incorporating analyst feedback with results generated pursuant to malicious inference method 122 for investigating newly surfaced threats. This may comprise providing a visualization of the results (e.g. via a graphical and/or textual display) according to visualization step 126. In embodiments, Analyst feedback step 130 may comprise an interactive visualization of the results, whereby the analyst may provide feedback, which may, for example, confirm and/or reject malicious activity/status via visualization and analyst labels steps 126 and 128. In embodiments, the displayed results may be grouped or clustered according to a logic which facilitates investigation according to graph clustering step 124, whereby the clustered results may be presented in the visualization.

In embodiments, malicious inference method 122 may be repeated on the analyst labeled results. In embodiments, steps 122, 124, 126, and/or 128 may be repeated at least once, and may be repeated multiple times subsequent to the initial belief propagation step performed on the graph constructed in step 108. Thus, Analyst feedback step 130 may be a repeating loop of steps, whereby an initial belief propagation step is performed on the graph constructed in step 108, then any subsequent belief propagation(s) may be performed on a graph incorporating analyst feedback. In various embodiments, analyst feedback step 130 may be repeated until results are substantially consistent. That is, new predictions and/or scoring remains substantially the same after repeating the loop.

Graph Clustering

In embodiments, clustering step 124 groups together related predictions and/or malicious behavior to facilitate threat investigation. In embodiments, related entities may be grouped into clusters based on scores, attributes, and/or context.

The purpose of grouping is to present the analyst with a single "story" or "case" to investigate as a threat, in accordance with various embodiments of visualization step 126.

As a simple example, if there are three malicious domains hosted by the same destination IP, then all four entities can be grouped together for the analyst to investigate simultaneously. Otherwise (as would happen in other detection software), these three malicious domains would appear separately as three malicious entities in a list, with no indication that they are actually part of the same malware campaign. Thus, clustering may significantly speed up investigations in addition to providing immediate context that an analyst would otherwise need to write queries to discover (for example, a conventional investigation of a given a domain may involve querying to determine the destination IP hosting this domain, the possible existence of other similar domains registered with this destination IP that need to be investigated, etc.).

The clustered information may be presented as a map or diagram, which may show relationships between entities, malicious scores, etc., using various graphics (e.g. colors, shapes, lines, textual and/or pictorial labels, etc., according to visualization step 126).

In embodiments, Graph clustering step 124 may comprise grouping seed entities, which are the entities labeled as malicious/suspicious and predicted entities according to step 110, into clusters. In embodiments, relationships for grouping entities may take the time of malicious activity into consideration. In embodiments, logic rules for computing clusters may also depend on graph attributes and graph context of vertices and edges. For example, if a domain has a score that fails within the threshold of suspicious entities after the belief propagation is run (where the thresholds are configurable), then any destination IP, source IP, and user that is related to this domain may be added to the cluster. Then the graph may contain other related context to these entities. For example, DNS logs may show that the source IP attempted multiple connections with response NXDOMAIN (an error message meaning that a domain does not exist). Then all of these entities involved in these requests should also be added to the cluster. As another example, if one domain is labeled as malicious and shares the same registry information (as may be obtained from external sources which provide information about parties responsible for a domain name or IP address) as other domains, then the other domains should also be marked as suspicious. In summary, any graph attributes/context coming from any of the log sources indicating that the related entities are part of the same threat may be used in the logic to compute the clusters.

Additionally, Graph clustering step 124 may comprise filtering/pruning entities from the graph, wherein such entities may be insignificant to the investigation and/or output.

Experimental Work:

Two datasets were studied, as well as the parameterization of the models used in the above described method.

A. ISCX Botnet Dataset

Introduced in 2014, the ISCX Botnet dataset (see E. B. Beigi, H. H. Jazi, N. Stakhanova, and A. A. Ghorbani, "Towards effective feature selection in machine learning-based botnet detection approaches," in 2014 IEEE Conference on Communications and Network Security, 2014, pp. 247-255) is a comprehensive dataset released in packet capture (pcap) format which contains activity traces of 16 types of botnets, as well as legitimate traffic. To build the dataset, the authors combined traces extracted from the ISOT botnet detection dataset (see D. Zhao, I. Traore, B. Sayed, W. Lu, S. Saad, A. Ghorbani, and D. Garant, "Botnet detection based on traffic behavior analysis and flow intervals," Computers & Security, vol. 39, pp. 2-16, 2013), the ISCX 2012 IDS dataset (see A. Shiravi, H. Shiravi, M. Tavallaee, and A. A. Ghorbani, "Toward developing a systematic approach to generate benchmark datasets for intrusion detection," computers & security, vol. 31, no. 3, pp. 357-374, 2012), and traffic generated by the Malware Capture Facility Project (see "Malware capture facility project." [Online]. Available: http://mcfp.weebly.com/). The botnet traffic is either captured by honeypots, or through executing the bot binaries in safe environments. Table II summarizes the characteristics of the data.

TABLE 2

CHARACTERISTICS OF THE ISCX 2014 BOTNET DATASET

| Split | #Flows | #Src IPs | #Dst IPs | #Src/Dst IPs | #Flow TS | #Mal. TS | #Ben. TS |
|---|---|---|---|---|---|---|---|
| Training | 356160 | 7355 | 40502 | 57321 | 65737 | 38485 | 27252 |
| Testing | 309206 | 6392 | 17338 | 28657 | 36532 | 13480 | 23052 |

The dataset was divided into a training (4.9 GB) and testing set (2.0 GB), where the training split included traffic generated by 7 botnet types, while the testing set contained traffic generated by 16 botnet types. This challenging dataset was used to evaluate whether models that have been trained to detect a reduced set of botnets can accurately detect unseen botnets. In their best-performing effort, a detection (true positive) rate of 75% and a false positive rate of 2.3% was reported.

From pcap to Flow Features

FlowMeter, a network traffic flow generator, was used to separate the packet capture data into individual flows. (see G. Draper-Gil, A. H. Lashkari, M. S. I. Mamun, and A. A. Ghorbani, "Characterization of encrypted and VPN traffic using time-related features," in Proceedings of the 2nd International Conference on Information Systems Security and Privacy Volume 1: ICISSP, 2016, pp. 407-414]. FlowMeter aggregates flows on the basis of the 5-tuple set (Source IP, Source Port, Destination IP, Destination Port, Protocol) and a timeout parameter. Each flow may be described with the following 23 features: Duration, Bytes per second, Packets per second, Min/Max/Avg/Std packet inter-arrival times, Min/Max/Avg/Std inter-arrival times of sent packets, Min/Max/Avg/Std inter-arrival times of received packets, Min/Max/Avg/Std active time, and Min/Max/Avg/Std idle time.

Labeling the Dataset

The dataset included a list of malicious IPs and their corresponding botnet types. In some cases, individual IPs were reported, but in others, source and destination IPs were reported as a pair. Therefore, all flows that include one of the individually listed IPs (either as source or destination), and all flows where both the source and destination IPs match a reported pair, were labeled as malicious. All remaining flows were considered benign. Although the botnet type associated with the malicious IPs were reported, the problem was approached as a binary classification problem (malicious vs benign).

Flow Features to Source/Dest IP Features

First retrieved were all the flows that involve the same pair of source and destination IPs (independently of ports and protocols). Thus, for each pair of source/destination IPs, a t×p matrix was obtained, where t represents the number of flows, and p=23 represents the number of features. Each of the 23 features were then averaged across all the flows to obtain a single feature vector for each pair of source IP and destination IP. This way, the preprocessing of the training split resulted in a 57321×23 matrix (num. source/dest IP pairs×features), while the testing split resulted in a 28657×23 matrix.

Interpretation of the Dataset as a Graph

The resulting dataset can be viewed as a bipartite graph where the source IPs correspond to the first disjoint set of nodes, and the destination IPs correspond to the second. A source IP may be connected to a destination IP if there is at least one connection between the two entities. Note that each edge may be characterized with a feature vector $\omega$, where $\omega \in \mathbb{R}^{23}$.

Experimental Setup

The communication graph described in the previous section was analyzed by a hybrid approach using both classification methods and graph belief propagation. The goal was to infer malicious communications and then use the structure of these malicious communications to predict which entities may be the sources of malicious activity.

B. Real-World Delivery Dataset

One-month worth of logs generated by an enterprise next generation firewall was considered for targeting the detection of delivery via web traffic (see A. Delivery under Advantage of using time evolving graph analysis in cybersecurity section of the present disclosure). These log files register approximately 40 million log lines and 2.2 million active entities daily, summing to a total of 1.2 billion log lines and 66 million analyzed entities.

Entities

As described above, the analyzed entities were internal IPs, external IPs, and domains. It is noted that:

There are many-to-many relations between source and destination IPs.

There are many-to-many relations between destination IPs and domains.

Each pair of entity instance and day is described with a set of features describing its 24-hour activity.

Extracting Daily Features

In this step, features were extracted by aggregating all the activity of each entity within a 24-hour time window. Additionally, features describing the cross entities (source IP, Dest IP), and (source IP, Domain), were extracted. Such features captured the network profile of the communications between two specific entities. The considered features captured information about the number of connections, the bytes sent and received per connection, the packets sent and received per connection, the duration of the connections, and the intervals between connections, as well as information about relevant ports, applications and protocols, and alerts raised by the firewall. Table III summarizes the characteristics of the dataset.

TABLE III

SUMMARY OF THE CHARACTERISTICS OF THE REAL-WORLD DELIVERY DATASET

| Entity | Avg. daily count | Extracted features |
|---|---|---|
| Log Line | 40000000 | |
| Internal IP | 18260 | 65 |
| External IP | 228995 | 58 |
| Domain | 15063 | 25 |
| Internal/External IP | 1590164 | 62 |
| Internal IP/Domain | 301000 | 38 |

Labeling the Dataset

The dataset was labeled using a combination of verification methods and validation through domain experts, that is, cybersecurity analysts. The present disclosure performs outlier analysis on the feature data on a daily basis, and investigates the top outliers using VirusTotal ("VirusTotal" [Online], Available: https://www.virustotal.com). VirusTotal aggregates the output of more than sixty antivirus programs and URL scanners. The present disclosure considers a domain to be suspicious if it may be reported by at least one antivirus program or scanner, or if the domain was created less than a month before the observed activity. The curated list of suspicious domains (between 40 and 50 on a weekly basis) was provided to the human analyst for further investigation. (It may be important to note that this labeling process may be noisy, not only because antivirus programs, and domain experts themselves might present false positives and false negatives. In fact, creating and labeling a real-world dataset may be challenging in itself, both because the labeling must be performed by human analysts, a scarce resource with very limited bandwidth, and because, in practice, the context required to determine whether a particular entity may be involved in an attack may be often missing. This severely limits the number of labeled attack examples available for offline modeling and experimentation).

Interpretation of the Dataset as a Time-Evolving Graph

Each daily snapshot of the dataset can be viewed as a graph composed of different types of nodes (users, internal IPs, external IPs, and domains), and where edges are present whenever two entities have an association. Note that both nodes and edges are characterized with feature vectors $\omega_n$, $\omega_e$ respectively, where $\omega_n \in R^{pn}$, $\omega_e \in R^{pe}$, and pn, pe are the number of features used to describe the activity of a node or an edge respectively.

As the dataset covered 30 consecutive days, 30 daily graphs were obtained. From one day to the next, the graph can change in different ways:

New nodes can appear corresponding to new entity instances presenting activity,

Existing nodes can disappear corresponding to existing entity becoming inactive, New edges can appear, corresponding to new associations between entities that did not have a previous relationship Existing edges can disappear, corresponding to entities ceasing to be associated over time, Existing edges can be described by a different feature vector, corresponding to a variation of the network profile of the association between two entities.

As a consequence of the per-entity and per-time-segment feature extraction, the activity of recurrent entities was captured at several time instants, forming a multivariate time series of behavioral features. Approaching modeling problems from a time series perspective enables modeling large periods of time while preserving granular information thanks to the use of short time segments.

For each of the 30 daily graphs, the graph was analyzed using the methods described in Section IV, where daily probabilities of maliciousness were obtained for every entity in the graph. The time series of these malicious predictions was then analyzed to output any entities whose prediction probability was high over multiple days.

Results:

An algorithm for the disclosed subject matter was implemented in Spark GraphFrames and the Belief Propagation algorithm implemented in Spark from [A. Ulanov and M. Marwah, "Malicious site detection with large-scale belief propagation," Strata+Hadoop World, 2017.] was further utilized. For the neural network probabilistic classifier in Step 202 of method 122, analysis was performed in tensor flow (see Tensor flow, "Tensor flow: Large-scale machine learning on heterogeneous distributed systems," CoRR, vol. abs/1603.04467, 2016. [Online], Available: http://arxiv.org/abs/1603.04467).

AISCX Botnet Dataset

The disclosed method was first tested on the ISCX Botnet dataset, which was partitioned into training and test sets. The graph was first constructed from the combined training and sets in Spark GraphFrames. The labels on the training set were used as seeds to initialize the node attribute fields in the graph, and a classifier was run on the training edges to obtain a prediction probability of maliciousness of each edge. The edge attributes of the graph were then updated with the edge factors according to Malicious inference method 122, as detailed above, and the resulting graph was input to the belief propagation algorithm described in A. Ulanov and M. Marwah, "Malicious site detection with large-scale belief propagation," Strata+Hadoop World, 2017. The output was predicted probabilities of maliciousness for each entity.

The malicious activity detection results are presented as ROC plots, with axes true positive and false positive rates. The ROC plot is obtained by choosing a threshold for the probability of maliciousness for each node and assigning the output as malicious if the predicted probability is above this threshold. The ground truth state was then used to label the prediction output as false positive, true positive, false negative, or true negative.

The structure and parameters for the neural network in the classification step were tuned, and the final neural network classifier had two hidden layers utilizing rectified linear units. Additionally, experimenting with the number of nodes in the hidden layers revealed that a hidden layer size of 10 gives good results with reasonable computation time. The neural network classifier consistently outperformed the logistic regression classifier, with the best performing method giving ROC AUC=0.841 (compared to the best performing logistic regression classifier with ROC AUC=0.791).

Figure 5:
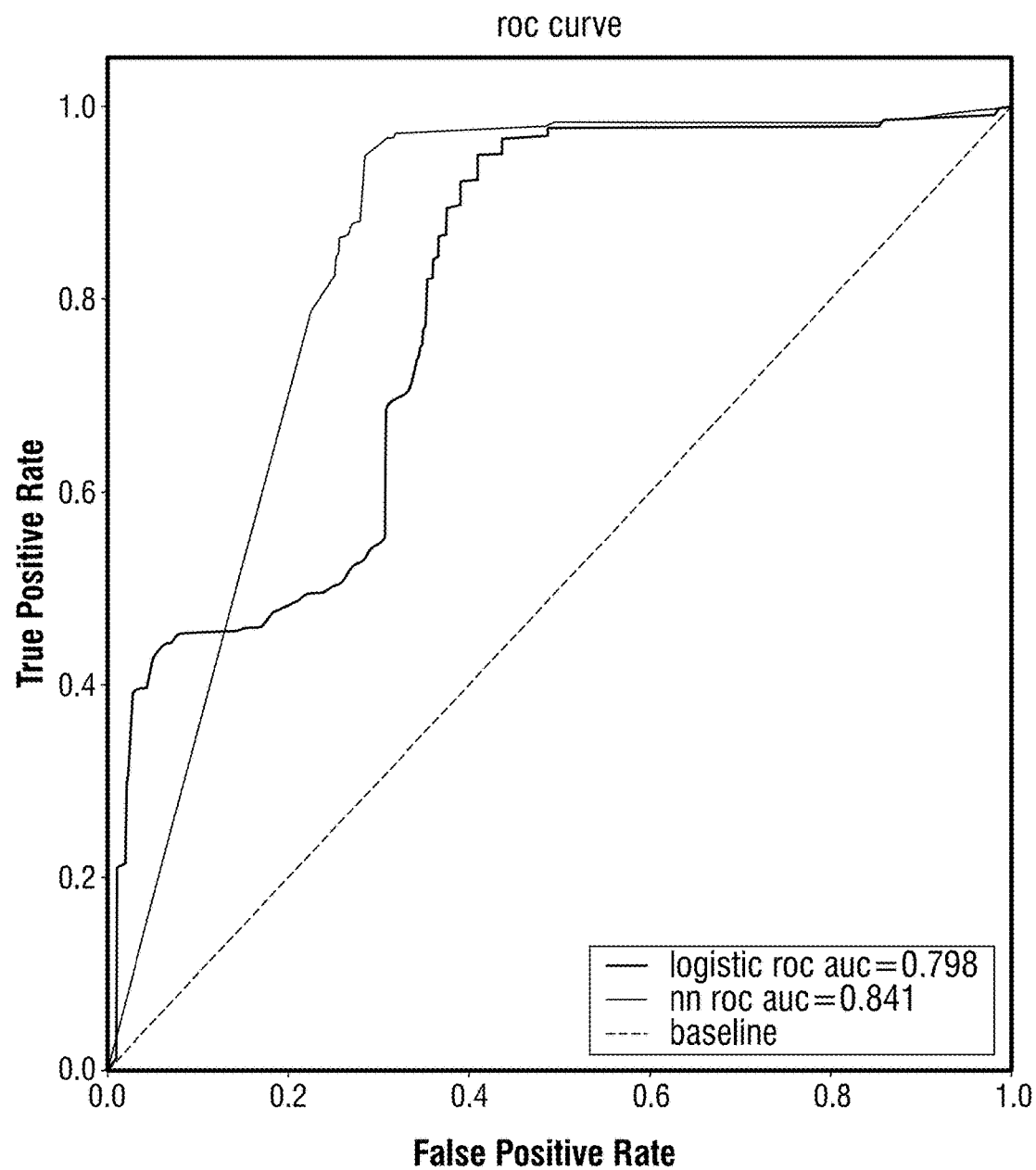
FIG. 5 is an ROC curve on ISCX training and test data for comparing results from neural network and logistic regression classification methods.

In addition to testing the disclosed subject matter methods using the given partition of training and test set, the present disclosure also incrementally randomly sampled data from the training set to add to the test set to study how increasing the number of labels changes the performance of the algorithm. As the ROC plot in FIG. 5 shows, randomly sampling 10% of labels from the training set lowered the average AUC for both classification methods, with a significant decrease in AUC for the logistic regression classifier.

B. Real-World Delivery Dataset

For a real-world dataset, log data of a large enterprise environment was analyzed. Using a 24-hour time window, entities of source IPs and domains were extracted to create an edge in the graph for a source IP visiting a domain during the time window. The labels for malicious delivery domains were confirmed by security analysts at the enterprise and were used as seeds in the graph analysis. If a domain was labeled malicious by the security analyst, then every time window graph containing this domain used the label as a seed.

Figure 6:
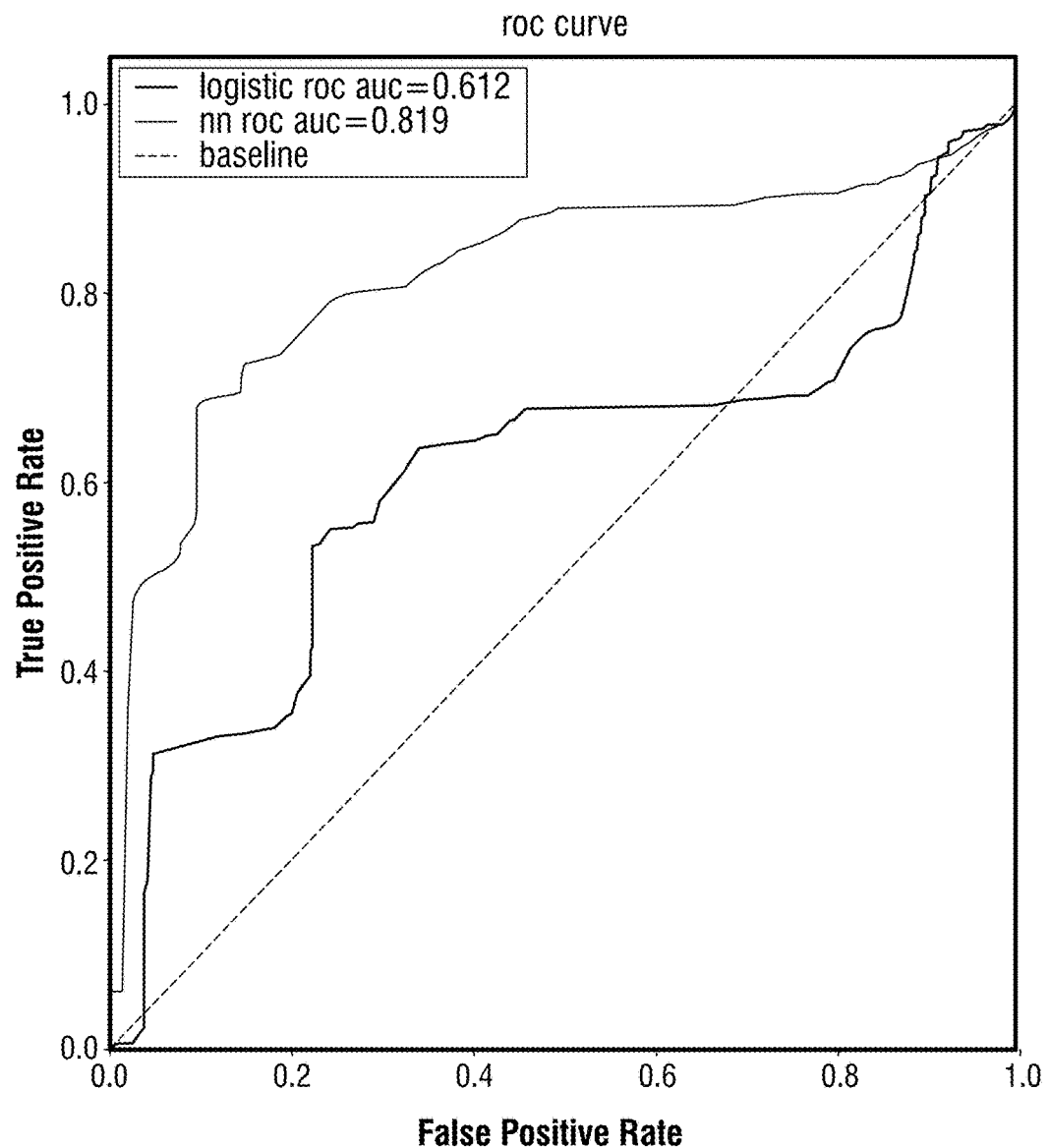
FIG. 6 is a graph and ROC curve showing average true positive/false positive rates where 10% of the labels from the training data are chosen at random to add to the test data.

For each 24-hour window graph, 10-fold cross validation was used on the domain entities to compute the classification performance. After analyzing each 24-hour time window, the time series of predicted maliciousness was considered over all time windows. FIG. 6 shows a comparison between the ROC curve and AUC scores for the logistic regression and neural network methods.

Figure 7:
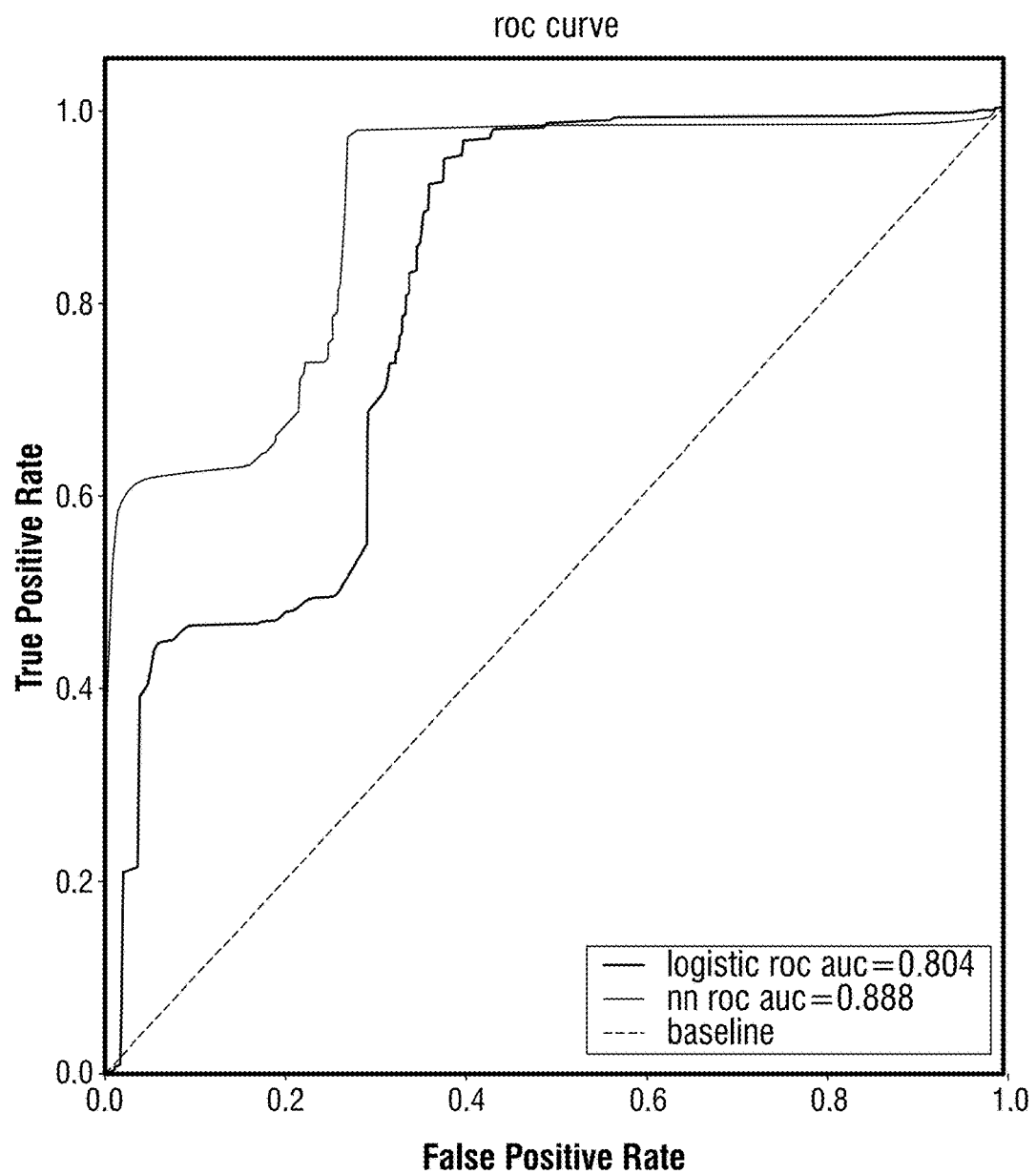
FIG. 7 is an ROC curve showing average results over 10-fold cross validation for a real-world dataset.
Figure 8:
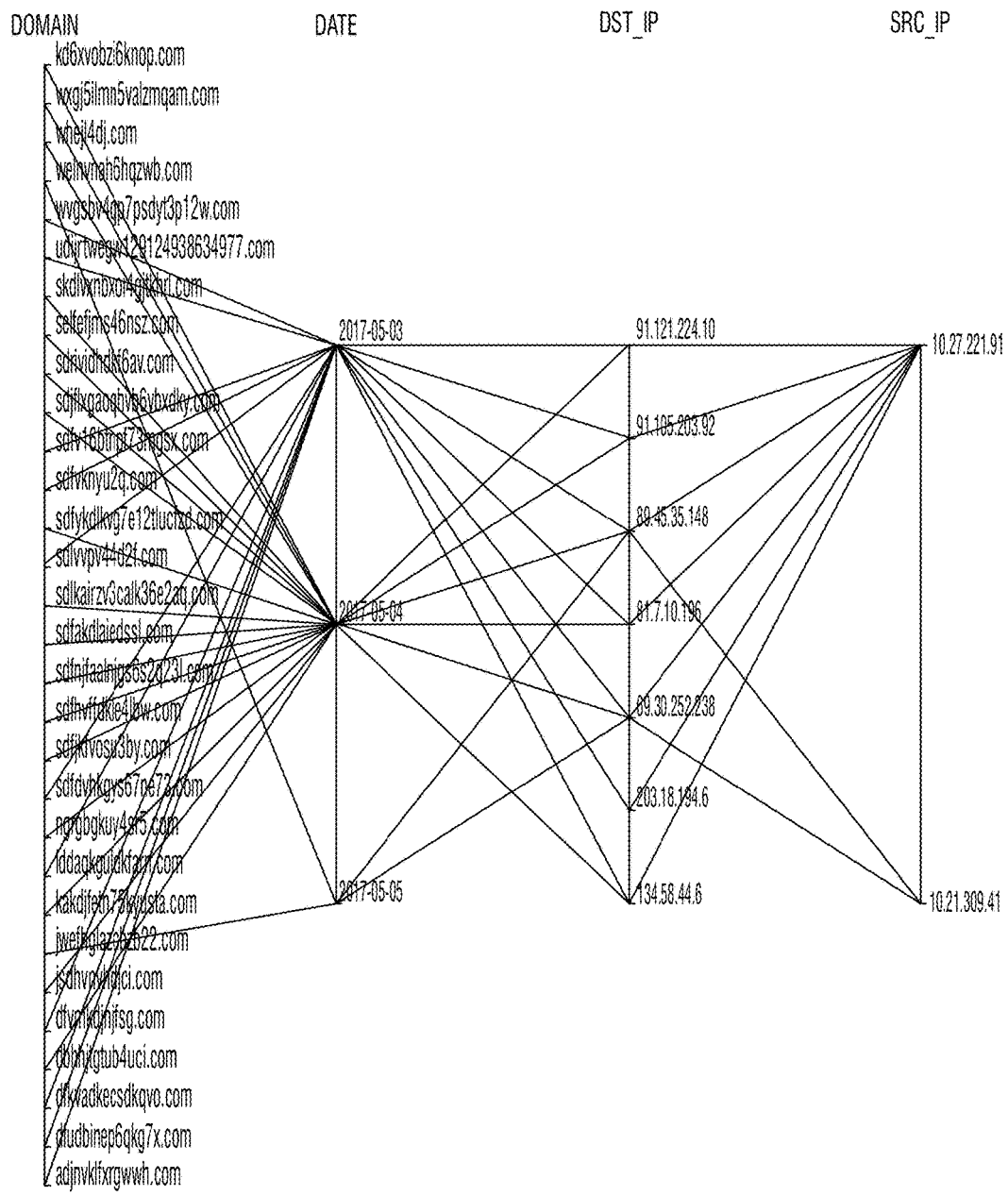
FIG. 8 is plot of domains having a high predicted probability of maliciousness.

As the source IPs are not given malicious/benign labels in the ground truth set, classification results cannot be reported for malicious source IPs. However, by further investigating source IPs with high predicted probability of maliciousness, patterns of source IP communications that indicate suspicious behavior were found. In the example presented in FIG. 7, each domain shown has high predicted probability of being malicious, and these domains are registered to multiple destination IPs over multiple days.

The first source IP 10.27.221.91 visited all of the destination IPs over a 2-day period, and the second source IP 10.21.309.41 started communicating with several of the destination IPs on the third day. The first source IP has predicted probability of maliciousness 0.84 and the second source IP has predicted probability of maliciousness 0.69. By investigating the first source IP, if the investigation points to the source IP being an infected host, the inference methods based on communication patterns indicate that the second source IP may be also likely to be malicious. Coupling the entities in such a way enables investigations that can find correlated malicious behavior in a more time-effective manner, saving analyst time and bandwidth.

Thus, the disclosure provides a unified graph inference approach for detecting malicious activity, utilizing both entity features and communication patterns between entities. The disclosed method(s) were analyzed on both publicly available data and data in a large enterprise environment to show that the method(s) are scalable and achieve high detection rates. In an enterprise environment, the disclosed method results in actionable security information and has the potential to dramatically reduce both analyst investigation time and response time. In embodiments, the disclosed method may be used to track the evolution of malware attacks within an enterprise environment, and may be used to determine how malicious activity may be correlated with other activities to detect other parts of the kill chain such as lateral movement.

Figure 9:
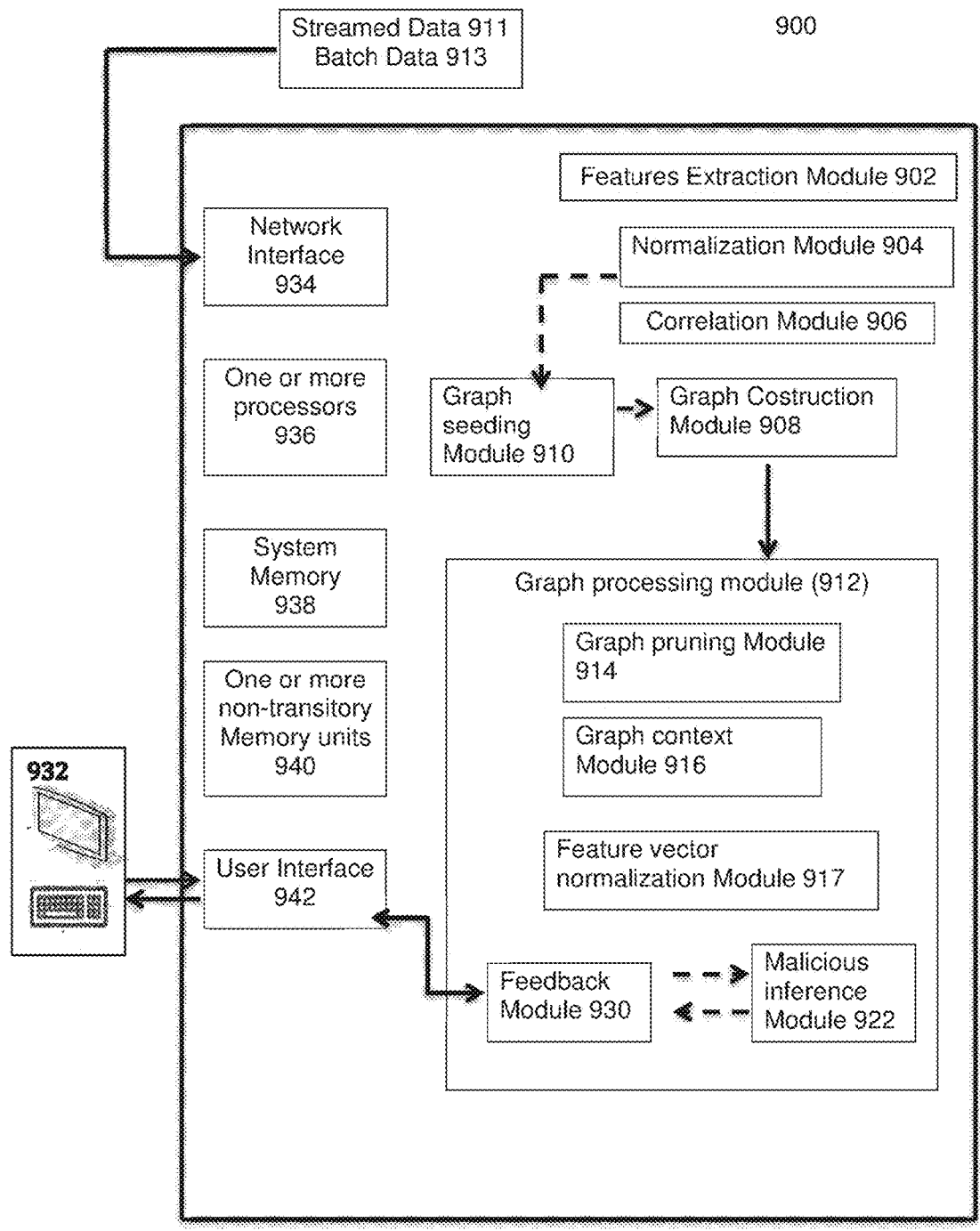
FIG. 9 depicts a block diagram illustrating an apparatus for carrying out the method of FIG. 2, in accordance with various embodiments.

FIG. 9 details a block diagram illustrating an exemplary apparatus 900 configured for identifying and detecting threats to an enterprise or e-commerce system, in accordance with various embodiments. In some embodiments, apparatus 900 comprises one or more processors 936, system memory 938, and one or more non-transitory memory units 940, all of which may be directly or indirectly coupled to and/or in communication with each other.

In embodiments, data may be input to and/or output from the apparatus 900 through a user interface 942 which may be in communication with at least one user interactive device 932. User interactive device 932 may comprise, for example, a keyboard, and/or a visualization screen, which may include a touch interactive screen. In embodiments, a user may interact with apparatus 900 via the at least one user interactive device 932 and through user interface 942.

Streamed data 911, batch data 913, or a combination thereof, may be fed into the apparatus 900 through a network interface 934 to a features extraction module 902 which comprises code stored on the one or more non-transitory memory units that when executed by the one or more processors are configured to parse the streamed data 911, batch data 913, or a combination thereof, by grouping or bunching log lines belonging to one or more log line parameters and then computing one or more features from the grouped log lines.

In embodiments, Features extraction module 902 may include an activity tracking and/or activity aggregation modules that when executed, may compute the one or more features by executing the activity and/or tracking modules. An exemplary activity-tracking module may, as the system absorbs the log stream generated by the platform, identify the entities involved in each log line, e.g. IP address, user etc., and update the corresponding activity records.

Streamed data 911 may comprise incoming traffic to an enterprise or e-commerce system. Batch data 913 may comprise web server access logs, firewall logs, packet capture per application, active directory logs, DNS logs, forward proxy logs, external threat feeds, AV logs, user logon audits, DLP logs, LB logs, IPS/IDS logs, black listed URLs, black listed IP addresses, black listed referrers, and combinations thereof. The one or more log line parameters may comprise at least one of: user ID, session, IP address, and URL query.

Some embodiments may normalize the extracted features data by executing a normalization module 918. Some embodiments, may further correlate the normalized data by executing a correlation module 906.

The extracted (correlated and/or normalized) features data may then be sent to a graph construction module 908, which comprises code stored on the one or more non-transitory memory units that when executed by the one or more processors are configured to construct an entity behavioral graph. In embodiments, the entity behavioral graph is an instance of a Bayesian Network. In embodiments, the entity-behavior graph may comprise vertices or nodes representing various entities inside and outside of the organization (e.g. users, internal IPs, external IPs, and/or domains). The graph may further comprise edges representing associations between entities (such as source IP and destination IP). In embodiments, the graph may include both nodes and edges having attributes (feature vectors) based on activity (communication behaviors) recorded in the logs.

In embodiments, the entity behavioral graph may be seeded with information regarding a malicious status of a subset of entities represented in the graph (malicious/suspicious predictions) by executing a graph-seeding module 910. In some embodiments, the graph-seeding module 910 may employ a predictive modeling system for generating malicious/suspicious predictions. In some embodiments, graph-seeding module 910 may generate malicious/suspicious predictions based on predictive modeling methods analyzed on log event data 904.

In embodiments, the entity behavioral graph may be seeded with information regarding a malicious status of a subset of entities represented in the graph (malicious/suspicious predictions) through user interface 942,wherein a user (cybersecurity analyst) may manually enter information via user interactive device 932 regarding one or more entities and/or a malicious status of one or more entities onto the graph.

The seeded graph may then be sent to a graph-processing module 912, which comprises code stored on the one or more non-transitory memory units that when executed by the one or more processors are configured to estimate or infer maliciousness of entities represented in the graph and/or communications represented in the graph.

In embodiments, graph-processing module may comprise a malicious inference module 922. In some embodiments, graph-processing module may further comprise a graph-pruning module 914, a graph context module 916, and/or a feature vector normalization module 917.

In embodiments, pruning may be performed on the constructed graph to identify and discard nodes that are unlikely to improve and/or may skew classifier results by executing the graph pruning module 914. In embodiments, context information may be added to the graph by executing the graph context module 916. In embodiments, feature vectors on the graph may be normalized by executing the feature vector normalization module 917.

In embodiments, malicious inference module 922 comprises code stored on the one or more non-transitory memory units that when executed by the one or more processors are configured to infer probability of maliciousness and/or maliciousness score for unlabeled entities, represented by nodes in the graph, and/or for communications between entities, represented by edges in the graph.

In some embodiments, the malicious inference module 922 may employ a probabilistic classifier to predict a probability of maliciousness for unlabeled edges in the constructed graph, wherein labeled edges may include any edge comprising at least one entity predicted as malicious. In embodiments, inference module 922 may further assign a probability of maliciousness for unassigned edges based on a similarity between a feature vector of a labeled edge and an unlabeled edge in the same neighborhood of edges. In some embodiments, inference module 922 may further assign edge potential functions based on the assigned probabilities of maliciousness. In some embodiments, inference module 922 may employ belief propagation to estimate the malicious probability of all nodes on the graph.

In some embodiments, graph-processing module 912 may present results generated via malicious inference module 922 (i.e. inferred probability of maliciousness and/or maliciousness score(s)) to a visualization screen of the at least one user interactive device 932 through the user interface 942.

In some embodiments, graph-processing module 912 may incorporate user (analyst) input with the results generated by the malicious inference module 922 via a Feedback module 930. The feedback module 930 may present a visualization of the results generated onto the visualization screen of the device 932 via user interface 942. Thereafter, the analyst may provide feedback via a keyboard and/or touchscreen of the device 932 via user interface 942. In embodiments, feedback provided by the analyst may include confirming or rejecting a malicious label, and/or providing another analyst defined label.

In embodiments, analyst feedback module 930 may include a clustering module, which may group or cluster the results presented through the visualization screen, according to a logic which facilitates investigation by the analyst. The clustering module may further filtering entities from the presented results to facilitate the investigation.

In embodiments, analyst feedback module may communicate continuously with malicious inference module 922 to further process the results via malicious inference module 922 pursuant to feedback received from the analyst. In embodiments, the results may be continuously processed as more feedback is received from the analyst.

All references, including publications, patent applications, and patents, cited herein are hereby incorporated by reference to the same extent as if each reference were individually and specifically indicated to be incorporated by reference and were set forth in its entirety herein.

The methods, systems, process flows and logic of disclosed subject matter associated with a computer readable medium may be described in the general context of computer-executable instructions, such as, for example, program modules, which may be executed by a computer. Generally, program modules may include routines, programs, objects, components, data structures, etc. that perform particular tasks or implement particular abstract data types. The disclosed subject matter may also be practiced in distributed computing environments wherein tasks are performed by remote processing devices that are linked through a communications network. In a distributed computing environment, program modules may be located in local and/or remote computer storage media including memory storage devices.

The detailed description set forth herein in connection with the appended drawings may be intended as a description of exemplary embodiments in which the presently disclosed subject matter may be practiced. The term "exemplary" used throughout this description means "serving as an example, instance, or illustration," and should not necessarily be construed as preferred or advantageous over other embodiments.

This detailed description of illustrative embodiments includes specific details for providing a thorough understanding of the presently disclosed subject matter. However, it will be apparent to those skilled in the art that the presently disclosed subject matter may be practiced without these specific details. In some instances, well-known structures and devices are shown in block diagram form in order to avoid obscuring the concepts of the presently disclosed method and system.

The foregoing description of embodiments may be provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims may be not intended to be limited to the embodiments shown herein, but may be to be accorded the widest scope consistent with the principles and novel features disclosed herein. It may be contemplated that additional embodiments are within the spirit and true scope of the disclosed subject matter.

What may be claimed is:

1. A system for detecting malicious activity in a time evolving network, comprising:
    a feature extraction step comprising extracting entities and behavioral features of the entities from log data generated by the time evolving network, the behavioral features including communication patterns of the entities;
    a graph construction step comprising constructing an entity-behavioral graph, wherein the entity-behavioral graph is a Bayesian Network, wherein:
        entities are represented as nodes in the graph,
        associations between entities are represented as edges in the graph,
        and
        each of said nodes and/or edges are associated with behavioral features derived from the log data;
    a graph-seeding step comprising labeling the graph with information regarding a malicious status of a subset of the nodes and/or edges represented in the graph, such that the graph comprises a labeled set of nodes and/or edges and an unlabeled set of nodes and/or edges; and
    a graph-processing step comprising inferring a malicious status for the unlabeled nodes represented in the graph, according to a malicious inference method, said malicious inference method comprising:
        determining a malicious status of unlabeled edges having at least one labeled node, and labeling these edges with edge probabilities, wherein a group of edges remains unlabeled,
        using a classification algorithm to predict an edge probability of maliciousness for each of the unlabeled edge of said group,
        adjusting the predicted edge probability for each edge in said group if there is a feature vector similarity between that edge and a labeled edge which is in a same neighborhood as the edge in said group,
        assigning edge potential functions based on the edge probabilities, and
        running belief propagation on the graph to infer a malicious probability for each of the unlabeled nodes.

2. The system of claim 1, further comprising performing a normalization step and/or a correlation step on the log data.

3. The system of claim 1, wherein the graph-seeding step comprises determining a malicious status for labeling nodes and/or edges by using: predictive modeling on the log data, external threat intelligence predictions, or a combination thereof.

4. The system of claim 3, wherein said predictive modeling comprises normalizing the log data and using an outlier detection method on the normalized log data.

5. The system of claim 3, wherein said predetermined predictions are based on blacklists, whitelists, or a combination thereof.

6. The system of claim 1, wherein said malicious status comprises a score indicative of a degree of suspected maliciousness.

7. The system of claim 1, wherein said graph-processing step further comprises a graph pruning step, a graph context step, a feature vector normalization step, or a combination thereof.

8. The system of claim 1, further comprising generating a first output comprising malicious predictions based on the malicious status inferred according to the malicious inference method, wherein said graph-processing step further comprises an analyst feedback step, said analyst feedback step comprising obtaining analyst feedback regarding said first output, wherein said analyst feedback comprises confirming, rejecting, and/or modifying the malicious predictions of said first output.

9. The system of claim 8, wherein said analyst feedback step further comprises a graph clustering step, comprising clustering the output generated according to the malicious inference method, wherein clustering comprises grouping entities presented in the output according to a logic which facilitates analyst investigation.

10. The system of claim 8, wherein said analyst feedback step further comprises a visualization step comprising presenting the output in a visualization.

11. The system of claim 8 further comprising generating a second output based on the analyst feedback regarding the first output, said generating a second output comprising running a second belief propagation on the first output based on the analyst feedback.

12. The system of claim 1, wherein the classification algorithm comprises a neural network classifier.

13. An apparatus configured for identifying and detecting threats to an enterprise or e-commerce system, said apparatus comprising:
    one or more processors, system memory, and one or more non-transitory memory units;
    a user interface in communication with at least one user interactive device, wherein data may be input and output to and from the apparatus through the user interface, the user interactive device comprising a keyboard, visualization screen, touchscreen, or combination thereof;
    a features extraction module comprising code stored on the one or more non-transitory memory units that when executed by the one or more processors are configured to group log lines belonging to one or more log line parameters and then compute one or more features from the grouped log lines;
    a graph construction module, which comprises code stored on the one or more non-transitory memory units that when executed by the one or more processors are configured to construct an entity behavioral graph based on the grouped features, the entity-behavioral graph including nodes representing entities and edges representing communication patterns between the entities;

a graph-processing module, which comprises code stored on the one or more non-transitory memory units that when executed by the one or more processors are configured to infer maliciousness of entities represented in the graph, wherein the graph-processing module comprises a malicious inference module, wherein the malicious inference module is configured to employ a probabilistic classifier to predict a probability of maliciousness for entities represented in the graph, wherein prior to processing, the graph includes a set of labeled and unlabeled entitles, and labeled and unlabeled edges, wherein, the malicious inference module is further configured to adjust a probability of maliciousness for unassigned edges based on a similarity between a feature vector of a labeled edge and an unlabeled edge in the same neighborhood of the labeled edge, wherein, the malicious inference module is further configured to assign edge potential functions based on the assigned probabilities of maliciousness to the edges, and wherein, the malicious inference module is configured to employ belief propagation to estimate the malicious probability of all nodes on the graph.

14. The apparatus of claim 13, wherein the graph-processing module is configured to present results generated via the malicious inference module to a visualization screen of the at least one user interactive device through the user interface.

* * * * *